(12) United States Patent
Steyer et al.

(10) Patent No.: US 7,607,306 B2
(45) Date of Patent: Oct. 27, 2009

(54) INFRARED SUPPRESSOR APPARATUS AND METHOD

(75) Inventors: William Steyer, Topsfield, MA (US); Christopher Marlow Kieffer, Revere, MA (US); Walter J. Tingle, Danvers, MA (US)

(73) Assignee: General Electric Company, Schenectady, NY (US)

( * ) Notice: Subject to any disclaimer, the term of this patent is extended or adjusted under 35 U.S.C. 154(b) by 772 days.

(21) Appl. No.: 11/196,466

(22) Filed: Aug. 3, 2005

(65) Prior Publication Data

US 2007/0028623 A1    Feb. 8, 2007

(51) Int. Cl.
*F02K 1/00* (2006.01)
(52) U.S. Cl. .................. 60/770; 60/39.5; 239/265.17
(58) Field of Classification Search ................ 60/39.5, 60/770, 264, 771; 239/265.17, 265.19, 127.3; 181/213
See application file for complete search history.

(56) References Cited

U.S. PATENT DOCUMENTS

| | | | |
|---|---|---|---|
| 4,226,084 A * | 10/1980 | Spears, Jr. .................... 60/262 |
| 4,295,332 A | 10/1981 | Steyer et al. |
| 4,800,715 A * | 1/1989 | Conway ..................... 60/39.5 |
| 5,372,006 A * | 12/1994 | Lair .......................... 60/226.2 |
| 5,666,802 A * | 9/1997 | Lair .......................... 60/226.2 |
| 5,746,047 A * | 5/1998 | Steyer et al. ................. 60/39.5 |
| 6,253,540 B1 | 7/2001 | Chew et al. |
| 6,615,576 B2 * | 9/2003 | Sheoran et al. .............. 60/39.5 |
| 6,988,674 B2 * | 1/2006 | Steyer et al. ........... 239/265.19 |
| 7,114,323 B2 * | 10/2006 | Schlinker et al. ............. 60/204 |
| 7,313,909 B2 * | 1/2008 | Skoog et al. ................. 60/39.5 |
| 2007/0028623 A1 * | 2/2007 | Steyer et al. ................. 60/772 |
| 2008/0112802 A1 * | 5/2008 | Orlando et al. .......... 415/208.1 |

* cited by examiner

*Primary Examiner*—William H Rodriguez
(74) *Attorney, Agent, or Firm*—William Scott Andes, Esq.; Armstrong Teasdale LLP

(57) ABSTRACT

A method for suppressing infrared radiation from an engine of an aircraft operating in an environment includes directing hot exhaust from the aircraft engine into a lobed mixer of a single baffle infrared suppressor having a collapsible, translatable baffle to generate alternating flows of hot exhaust gas and cold air. The method further includes directing the alternating flows of hot exhaust gas and cold air towards the single baffle assembly to mix the hot exhaust gas with the cold air.

20 Claims, 22 Drawing Sheets

INFRARED SUPPRESSOR APPARATUS AND METHOD

BACKGROUND OF THE INVENTION

This invention relates generally to infrared suppression devices and more generally to methods and apparatus for reducing infrared emission from gas turbines such as those used, for example, in helicopters.

In some helicopters used in hostile environments, gear boxes under helicopter rotors are driven by gas turbine engines. These engines rotate at very high RPM, although the helicopter rotors themselves rotate at low RPM because of their diameter. The tailpipes of the gas turbine engines are exhausted overboard. The tailpipe becomes very hot from this hot exhaust gas and thus provides a very bright infrared signal.

With recent advancements in weapons detection technology, there is growing recognition of the importance of reducing the infrared signature associated with gas turbine engines powering military aircraft and land combat vehicles. Signature reductions reduce the possibility of detection and pursuit by enemy anti-aircraft forces including heat-seeking missiles. At least two known configurations have been used to suppress infrared radiation from gas turbine engines. One of these configurations has a center plug is disposed in an exhaust flow that cooperates to block a line of sight to hot turbine parts of the engine. Another blocks the line of sight by ejecting hot gases from the suppressor at a substantial angle from the axial center line of the engine.

An example of an infrared suppressor is disclosed in U.S. Pat. No. 4,295,332, Steyer et al, which describes the use of splitters that perform a dual function of mixing hot and cool gas flows to reduce gas temperatures and also block line-of-sight infrared radiation. Since the conception of the suppressor disclosed in U.S. Pat. No. 4,295,332, additional developments have made possible even more compact and higher performance suppressor construction arrangements. However, even as suppressor construction arrangements have improved, threats have also improved and engine exhaust gas temperatures have been increasing as requirements for increased power and reduced weight have been imposed.

Moreover, current infrared suppression solutions trade performance, payload capability, and/or range for improved survivability. Applicants believe that all currently fielded rotorcraft infrared suppression systems are static systems. For example, one system described in U.S. Pat. No. 6,253,540 provides infrared suppression using static line of sight blockage and the mixing of exhaust gasses with cooling air via ejector action.

BRIEF DESCRIPTION OF THE INVENTION

Some aspects of the present invention therefore provide a method for suppressing infrared radiation from an engine of an aircraft operating in an environment. The method includes directing hot exhaust from the aircraft engine into a lobed mixer of a single baffle infrared suppressor having a collapsible, translatable baffle to generate alternating flows of hot exhaust gas and cold air. The method further includes directing the alternating flows of hot exhaust gas and cold air towards the single baffle assembly to mix the hot exhaust gas with the cold air.

Other aspects of the present invention provide a method for suppressing infrared radiation from an engine of an aircraft operating in an environment. The method includes directing hot exhaust from the aircraft engine into a lobed mixer of a single baffle infrared suppressor to generate alternating flows of hot exhaust gas and cold air. The method further includes directing the alternating flows of hot exhaust gas and cold air towards the single baffle assembly to mix the hot exhaust gas with the cold air, and positioning a hood and a panel of the infrared suppressor in accordance with the threat environment.

Still other aspects of the present invention provide a method for suppressing infrared radiation from an engine of an aircraft operating in an environment. The method includes directing hot exhaust from the aircraft engine into a lobed mixer of a single baffle infrared suppressor to generate alternating flows of hot exhaust gas and cold air. The method further includes directing the alternating flows of hot exhaust gas and cold air towards the single baffle assembly to mix the hot exhaust gas with the cold air, and selecting a mode of operation from a set of modes. The set of modes includes a first mode in which a direct view of an exhaust cavity is blocked, a second mode that pumps and blocks a line-of-sight into the engine, and a third mode in which backpressure is minimized or reduced.

Yet other aspects of the present invention provide an infrared suppressor for suppressing infrared radiation from an engine of an aircraft operating in an environment. The infrared suppressor is configured to direct hot exhaust from the aircraft engine into a lobed mixer of a single baffle assembly having a collapsible, translatable baffle to generate alternating flows of hot exhaust gas and cold air. The suppressor is further configured to direct the alternating flows of hot exhaust gas and cold air towards the single baffle assembly to mix the hot exhaust gas with the cold air.

Yet additional aspects of the present invention provide an infrared suppressor for suppressing infrared radiation from an engine of an aircraft operating in an environment. The suppressor is configured to direct hot exhaust from the aircraft engine into a lobed mixer of a single baffle assembly having a collapsible, translatable baffle to generate alternating flows of hot exhaust gas and cold air. The suppressor is further configured to direct the alternating flows of hot exhaust gas and cold air towards the single baffle assembly to mix the hot exhaust gas with the cold air. The infrared suppressor also comprises a hood and a panel that are repositionable in accordance with the threat environment.

Still other aspects of the present invention provide an infrared suppressor for suppressing infrared radiation from an engine of an aircraft operating in an environment. The infrared suppressor is configured to direct hot exhaust from the aircraft engine into a lobed mixer of a single baffle assembly having a collapsible, translatable baffle to generate alternating flows of hot exhaust gas and cold air. The suppressor is further configured to direct the alternating flows of hot exhaust gas and cold air towards the single baffle assembly to mix the hot exhaust gas with the cold air, and operate in a set of modes. The set of modes includes a first mode in which direct view of an exhaust cavity is blocked and which facilitates high infrared suppression when the aircraft is under threat, a second mode which blocks a line-of-sight into the engine and which represents a compromise between suppression and performance for some protection in hostile environments, and a third mode in which backpressure is minimized or reduced which facilitates high performance for emergency situations or benign environments.

Yet further aspects of the present invention provide an infrared suppressor for suppressing infrared radiation from an engine of an aircraft. The infrared suppressor includes a stage I duct, a stage II duct, and a stage III duct. The stage I duct has an adapter ring configured to slide over a tailpipe of the engine and a lobed mixer. The stage II duct is coupled to the stage I duct and has a collapsible and translatable single baffle assembly. The stage II duct is configured to receive exhaust from the engine that leaves the stage I duct. The stage III duct is coupled to the stage II duct and configured to receive exhaust from the engine that leaves said stage II duct. The stage III duct includes a hood and a panel that are positionable and/or rotatable to turn exhaust leaving the stage III duct.

Configurations of the present invention will thus be seen to provide considerable IR suppression of engines when required for survivability while providing the capability to minimize loss of performance, thus increasing payload capability, and/or range in more benign environments. In particular, some configurations provide a first mode the provides for high IR suppression in hostile environments, a second mode that provides some blockage of engine hot parts, and a third mode that provides high performance for benign environments.

DETAILED DESCRIPTION OF THE INVENTION

Figure 1:
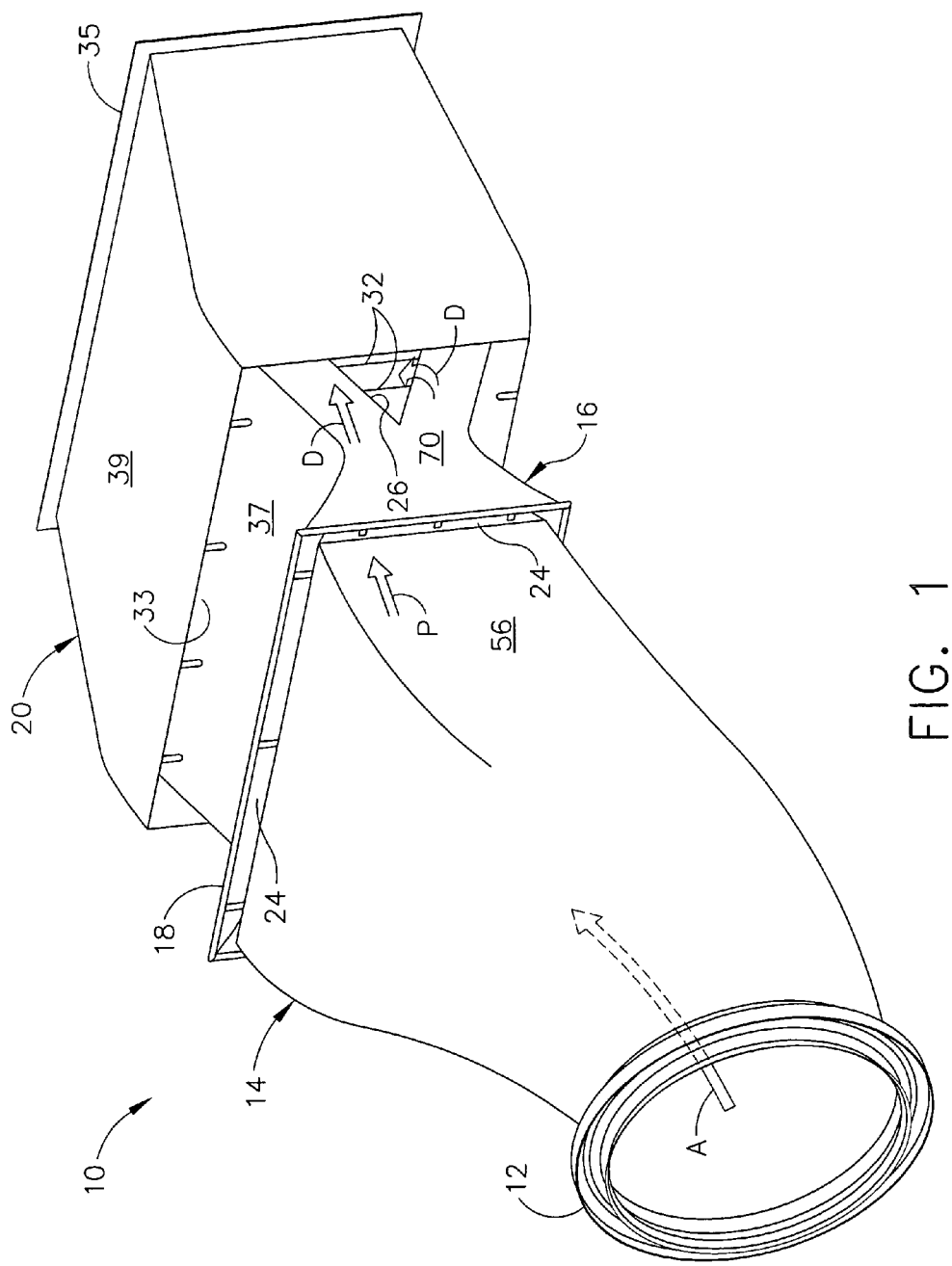
FIG. 1 is an isometric or 3-D view of an infrared suppressor assembly configuration of the present invention.

In some configurations and referring to FIG. 1, an infrared suppressor assembly 10 is fitted to the back end of a standard turboshaft or turboprop engine (not shown). An adapter ring 12 slides over the tailpipe of the turboshaft engine. Adapter ring 12 may comprise a finger seal having a plurality of metal strips (not shown) that fit over a cylindrical section of an engine and hold tight to it. The metal strips are mounted on a slidable and moveable disk, so that if the engine moves relative to suppressor assembly 10, adapter ring 12 takes up the movement. Hot exhaust gas from the jet engine thereby flows into a stage I duct 14 that transitions from a round shape to a rectangular shape in the natural direction of the exhaust flow. In some configurations, stage I duct 14 is straight, however, in other configurations, stage I duct 14 can be repositioned to facilitate guiding the exhaust flows from the engine and away from the aircraft.

Figure 2:
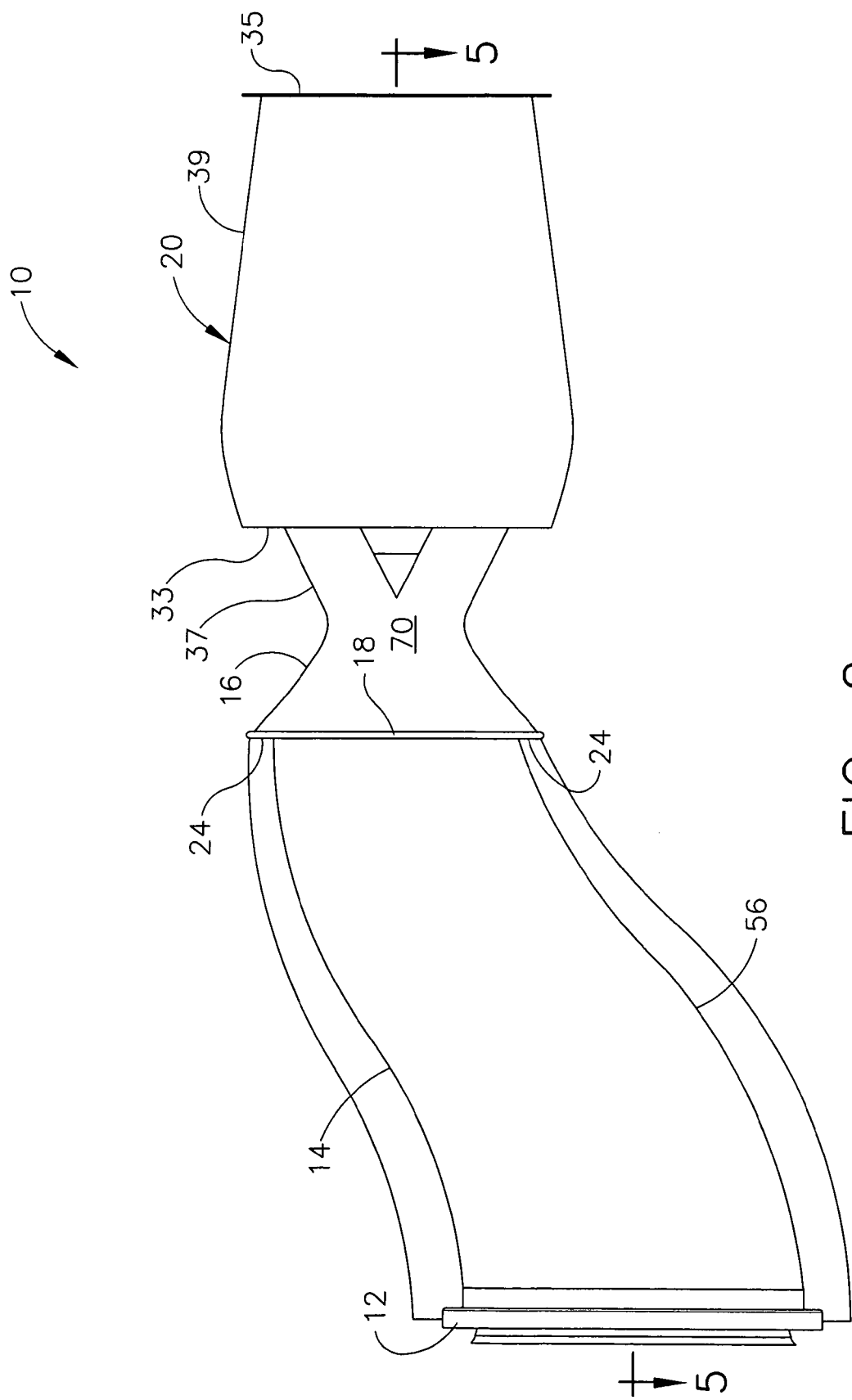
FIG. 2 is a side elevation view of infrared suppressor assembly configuration of FIG. 1.

FIG. 2 is a side elevation view of infrared suppressor assembly 10 of FIG. 1. A stage II duct 16 having a rectangular opening 18 and wall 37 (FIG. 3) receives exhaust from the jet engine that leaves stage I duct 14. Stage II duct 16 exhausts into a Stage III duct 20 that includes wall 39 and, among other things, physical barriers that prevent infrared sensors from looking up into infrared suppressor assembly 10 and using infrared sensors to observe hot parts of the jet engine (not shown in FIG. 2 but described in conjunction with other figures below). Stage I duct 14 fits into stage II duct 16 which, in turn, fits into stage III duct 20.

Figure 3:
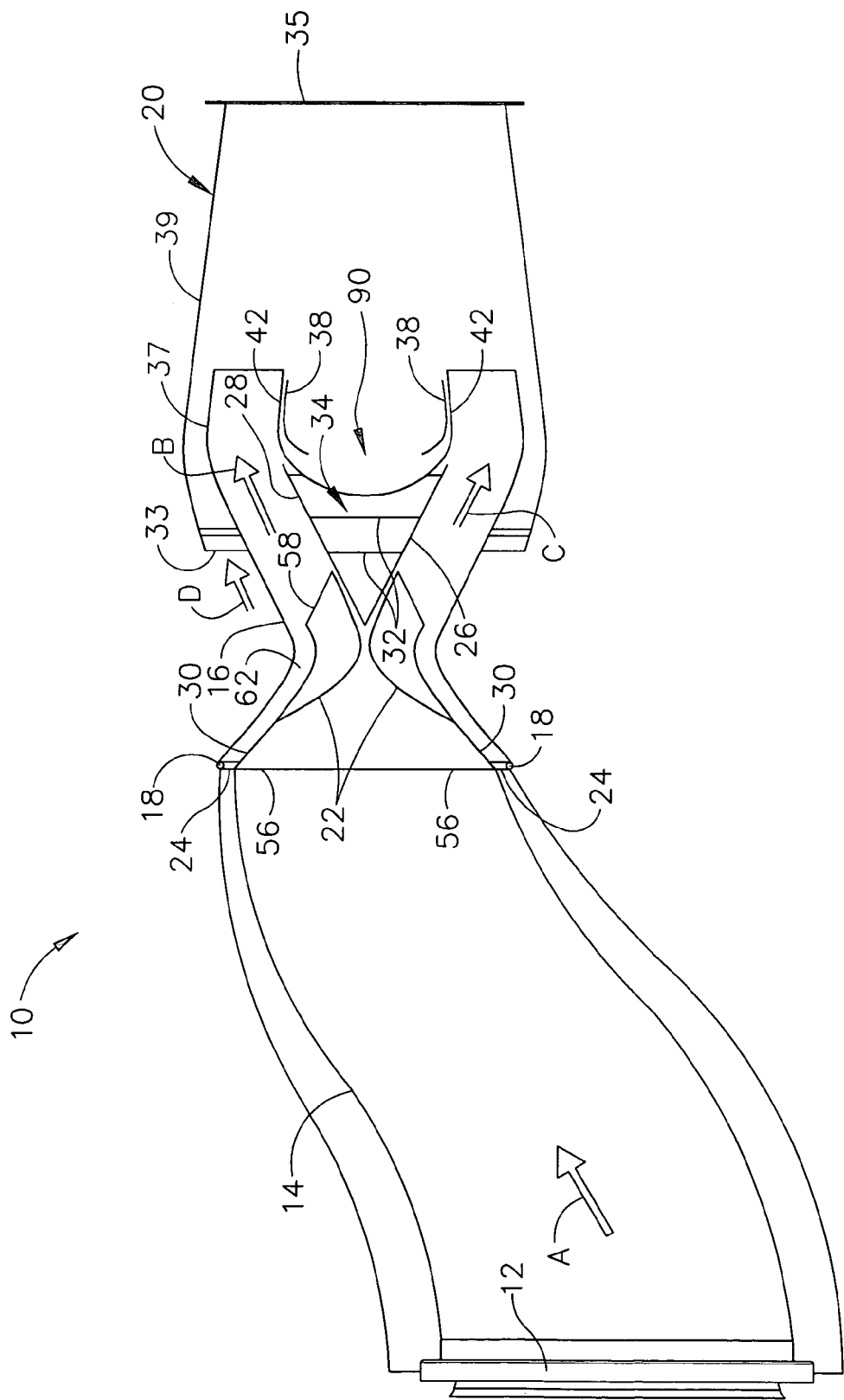
FIG. 3 is an upright, vertical section view in elevation through the middle of infrared suppressor assembly 10 shown in FIGS. 1 and 2.

FIG. 3 is an upright, vertical section view in elevation through the middle of assembly 10 shown in FIGS. 1 and 2. Hot engine air flow enters at adapter ring 12 and flows to the right as indicated by arrow A towards a plurality of spaced-apart lobes 22, only two of which are shown in FIG. 3. (Stage I duct 14 is also referred to herein as a "lobed mixer," for reasons that will become evident below.) In various configurations, infrared suppression assembly 10 creates an induced flow resulting from entrainment with static air in that a high speed air flow A draws additional air into assembly 10. The additional air is, advantageously, cold (as compared to engine exhaust) ambient air. In this manner, infrared suppression assembly 10 acts, in part, as an ejector-type nozzle. The mass flow within assembly 10 may be increased by about 150% (total) in some configurations by this entrainment of ambient air, which enters via an opening 24 formed around the rectangular exit end of stage I duct 14 by the larger rectangular input end 18 of Stage II duct 16. Air inlets 30 of lobes 22 open into opening 24 through stage I wall 56. Each stage can be mechanically coupled to the succeeding stage using, for example and without limitation, standoff posts or sheet metal wiggle strips.

Lobes 22 are spaced from one another in two rows. Lobes 22 are spaced in two horizontal rows perpendicular to the plane of FIG. 3, wherein the two rows are vertically separate from one another, as shown in FIG. 3. Therefore, lobes 22 only partially impede high speed flow A. A single forward (or "hot") baffle 26 is provided in hot high speed air flow A behind lobes 22. Wedge-shaped forward baffle 26 splits flow A into two approximately equal flows B and C and also serves to hide lobes 22 from a line-of-sight from an exit of stage III duct 20. Because the flows are approximately equal and mirror images of one another, a description of the top half of infrared suppression assembly 10 (i.e., a portion including only the uppermost horizontal row of lobes 22 from the viewpoint of FIG. 3) will suffice for an understanding of the present invention.

Flow A, coming from the left in FIG. 3, first hits inlets 30 of lobes 22. An exhaust flow inside stage I duct 14 that enters at ring 12 has to flow around lobes 22 and runs into forward baffle 26. Forward baffle 26 splits the exhaust flow into two flows B and C, one going up and one going down, in mirror image.

As the hot, high pressure exhaust flow races through stage II duct 16 it draws ambient, cool, outside air through opening 24. The flow of hot air between lobes 22 and over forward baffle 26 surface 28 draws cold air through opening 24 as a result of a reduction in pressure. The cold air drawn through opening 24 passes alongside columns of hot air, thereby cooling an exiting gas stream flowing up and over baffle 42, from which the exiting gas stream flows into stage III duct 20, which acts as another ejector nozzle that pulls in more cold air into voids denoted by 34 and 90 and into opening 33, all of which are open to the atmosphere.

Forward baffle 26 splits the hot, high pressure exhaust flow into two paths B and C. Forward baffle 26, which is substantially "V" shaped may include, in some configurations, a strut or other supporting structure 32. Forward or hot baffle 26 and cold baffle 42 together comprise a single baffle assembly, distinguishing it from previous designs that utilize a plurality of baffle assemblies. Cold baffle 42 is used to shield forward or hot baffle 26 as seen from an exit direction (i.e., looking into the exhaust exit of stage III duct 20). As used herein, a "single baffle assembly" is defined as a combination of a single hot baffle and a single cold baffle. Lobes 22 may also be present in a single baffle assembly, as may shields 38, further described below. However, an assembly having a plurality of forward or hot baffles, a plurality of cold baffles, or a plurality of both, is excluded from the term "single baffle assembly," and rather is referred to herein as a "plural baffle assembly." Moreover, a "single baffle infrared suppressor," such as infrared suppressor assembly 10, is referred to herein as a "single baffle infrared suppressor" configuration when it includes exactly one single baffle assembly and no plural baffle assemblies.

A cold air flow is guided into a recess or void 90 inside cold baffle 42, drawn from inlets 33. This air is drawn around into the top and bottom surfaces of cold baffle 42 (as shown in FIG. 3) and further guided by shields 38. Additional air is brought in at both sides of cold baffle 42, i.e., above and below the plane of FIG. 3. This additional air is brought in towards the plane of FIG. 3. Shields 38, which block the view of cold baffle 42 from the exhaust side, can be mounted to cold baffle 42 by a plurality of pins (not shown in the Figures), such as steel pegs, screws, bolts, standoffs, or rivets. These pins can be thermally conductive, to provide additional cooling of the surfaces of shields 38 and/or cold baffle 42. Other portions of the apparatus can be assembled using such pins as well.

Thus, a combination of holes or slits that allow air to enter void 34, the ejector action of forward baffle 26 drawing cold air upward and downward, and the guiding action of shields 38, a sheet of cold air mixes with hot exhaust exiting around forward baffle 26.

Line of sight shields (not shown in the Figures) can be provided to prevent a viewer looking upstream from exhaust end 35 from seeing hot parts of stage I duct 14. For example, mixer lobes 22 would normally be running hot because there is hot gas flowing underneath it. Line of sight shields can be added to prevent an observer from viewing lobes 22 looking into exhaust end 35.

Figure 4:
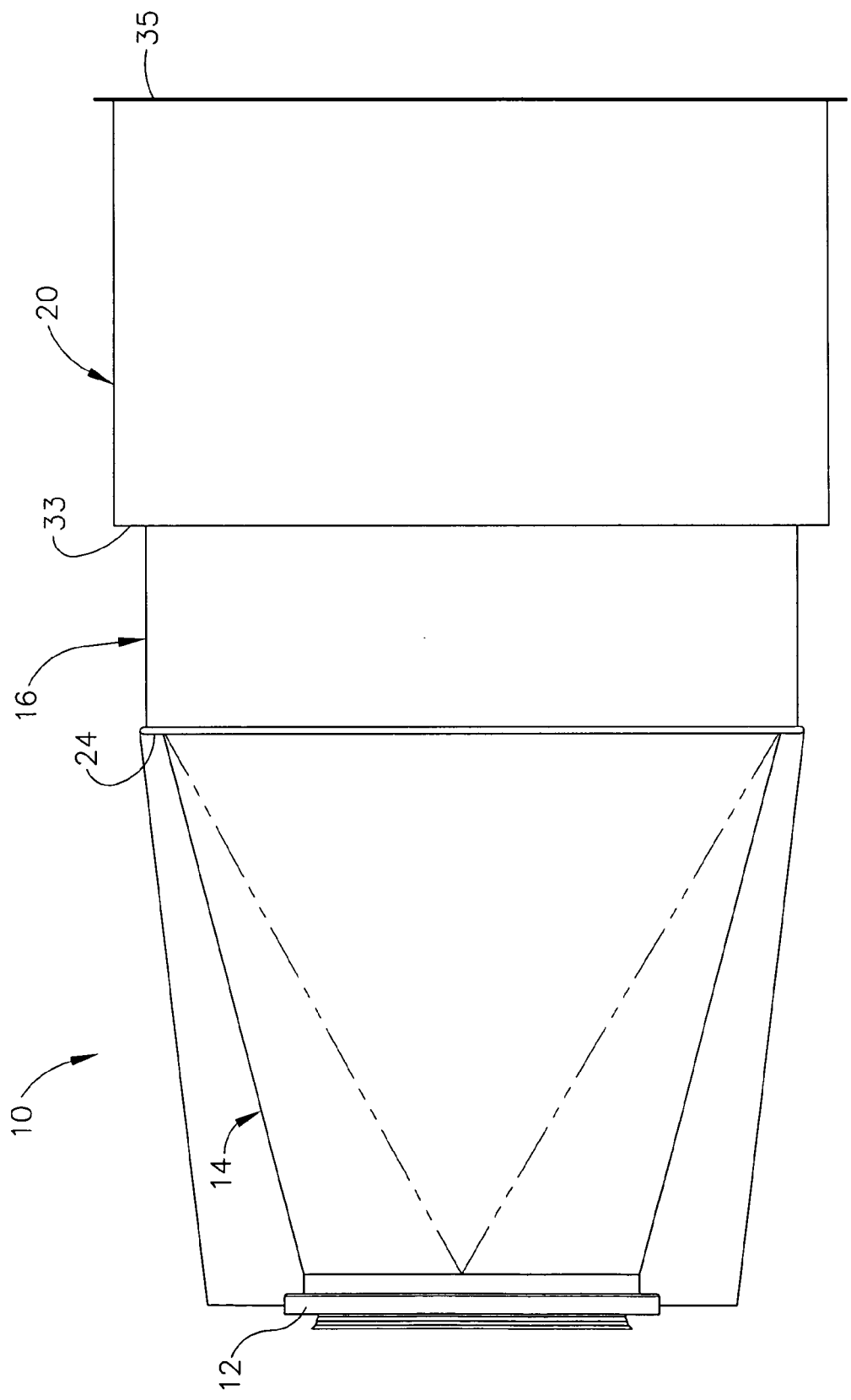
FIG. 4 is a top view of the infrared suppressor assembly of FIG. 1.

FIG. 4 is a top view of suppressor assembly 10. Adapter ring 12 is shown at the left, stage II duct 16 at the center, and stage III duct 20 at right.

Figure 5:
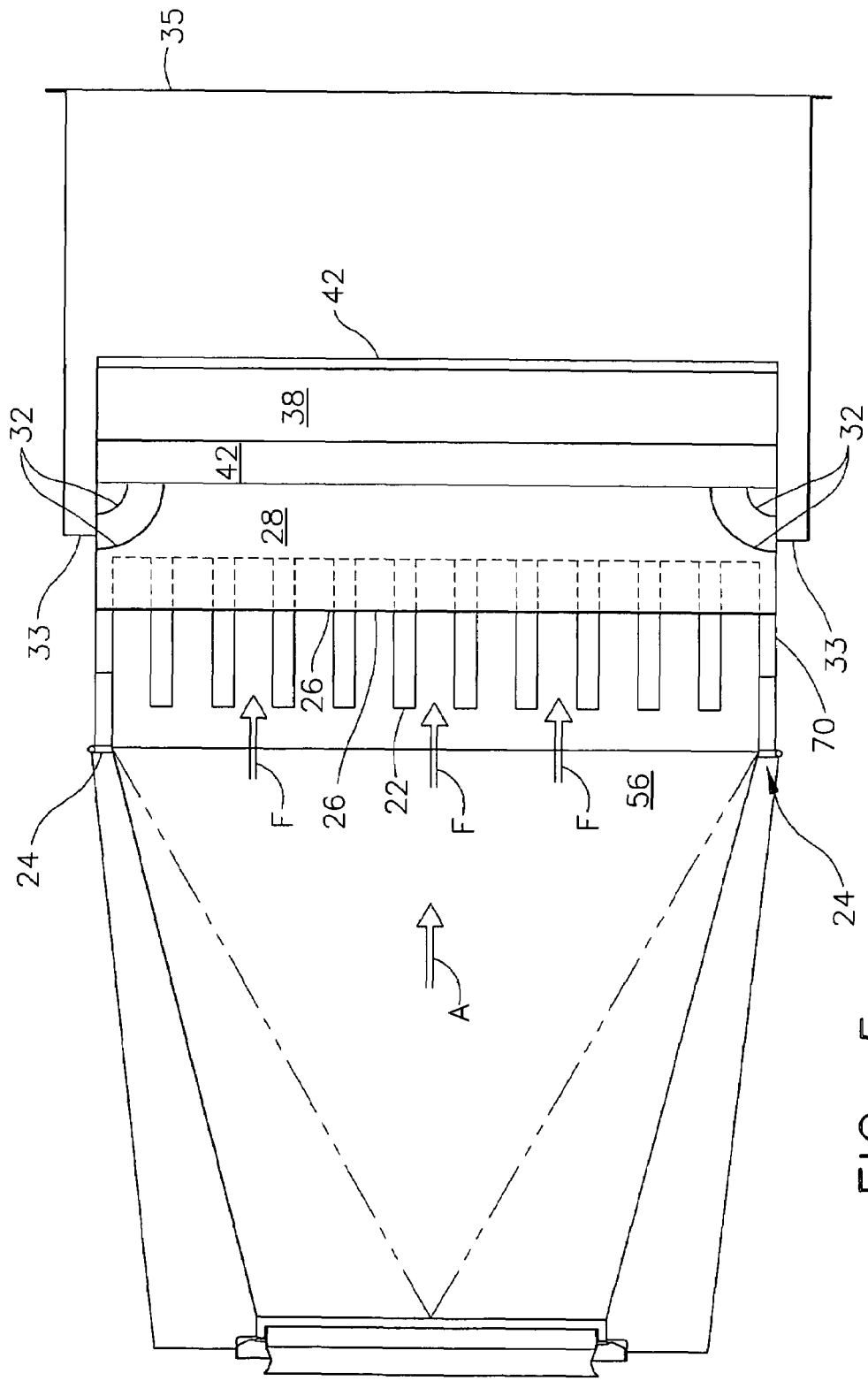
FIG. 5 is a centerline horizontal section through the infrared suppressor assembly of FIG. 1 along line 5-5, looking at the bottom half of the assembly with the top half removed. The centerline follows a curved axis of the assembly of FIG. 1.

FIG. 5 is a centerline horizontal section through assembly 10, looking at the bottom half of the assembly with the top half removed. (Note that the centerline through FIG. 1, which illustrates a turned configuration of stage I duct 14, is not straight. In configurations in which stage I duct 14 is not turned, the centerline would be straight.)

Figure 6:
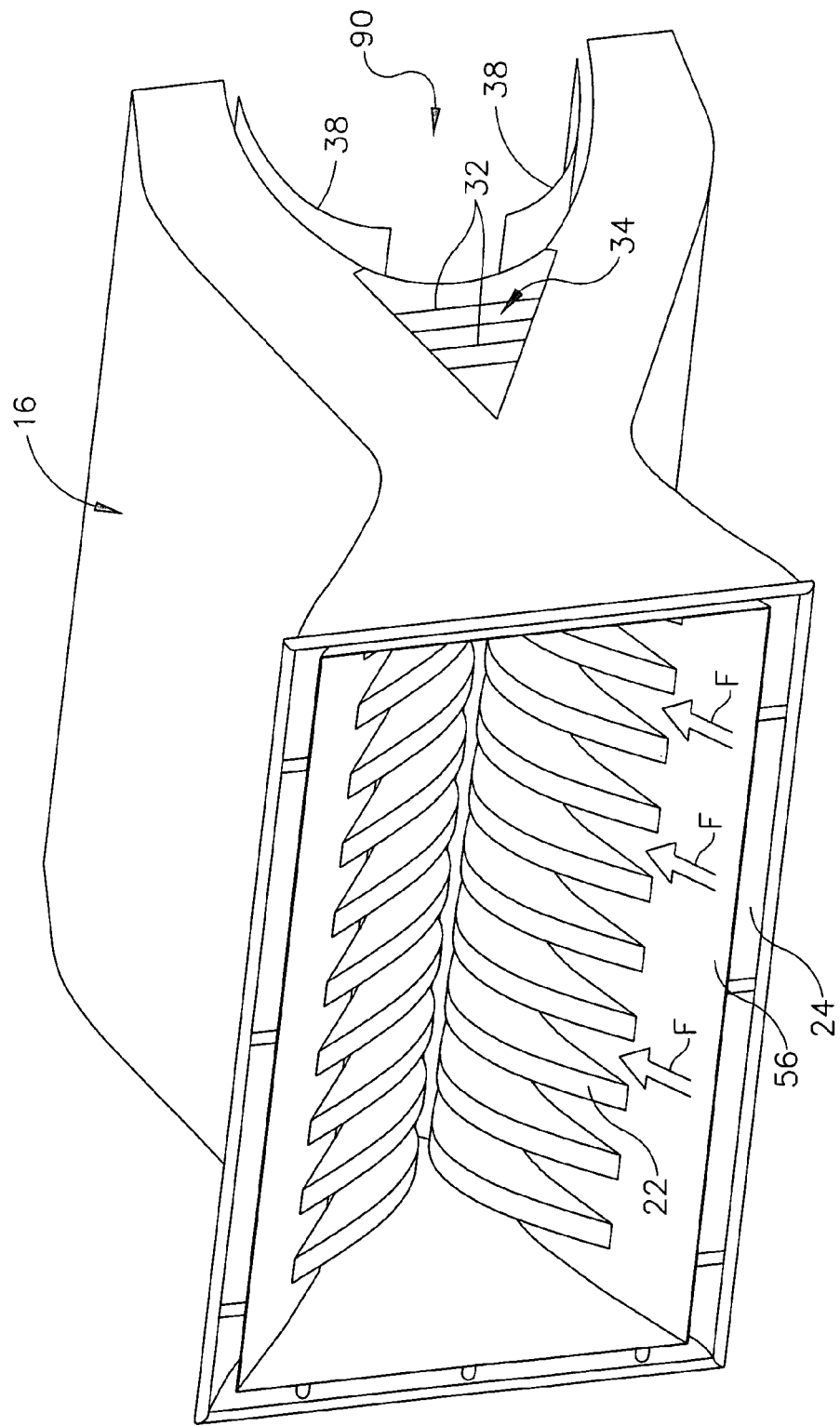
FIG. 6 is a 3-D view of a stage II duct of the infrared suppressor assembly of FIG. 1 and including a mixing portion of stage I duct.
Figure 7:
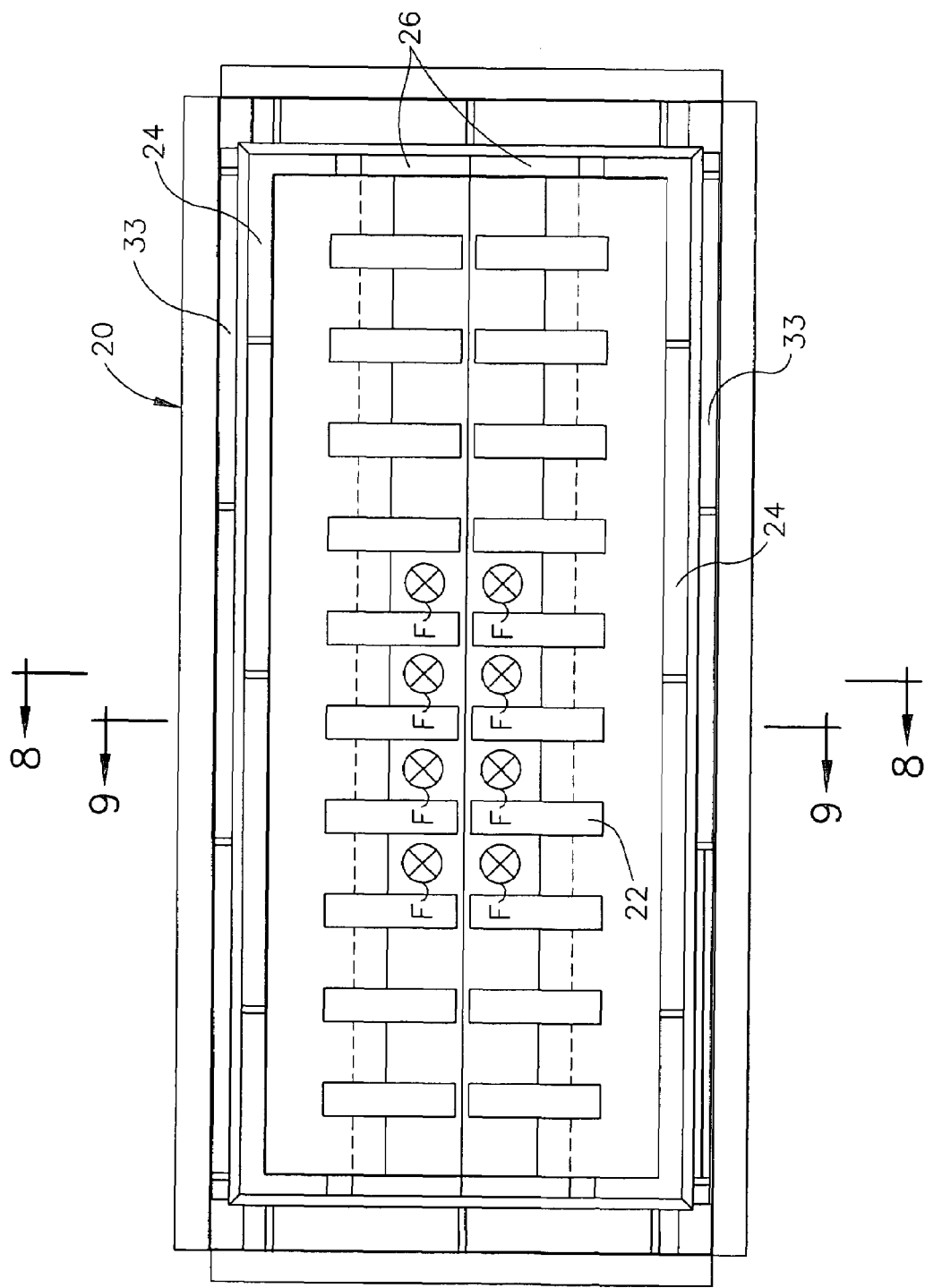
FIG. 7 is a forward-looking view aft of the stage I and II ducts shown in FIG. 6, and viewed in the direction of exhaust gas flow.

FIG. 6 is a partial cut-away perspective view of stage II duct 16 including the mixer section of stage I duct 14, and FIG. 7 is a view looking into the mouth of stage II duct 16, in the direction of exhaust gas flow. The incoming high pressure hot air flow is broken into a plurality of flows F (only a few of which are shown in the Figures, and those shown in FIG. 6 and FIG. 7 are not necessarily corresponding flows F) that flow between and past lobes 22.

FIGS. 6 and 7 are provided for orientation purposes. FIG. 6 is a sectional perspective view that is cut-away directly upstream of lobes 22 in stage II duct 16. Wall 56 is of stage I duct 14, and mixer section, is shown inside stage II duct 16.

Figure 8:
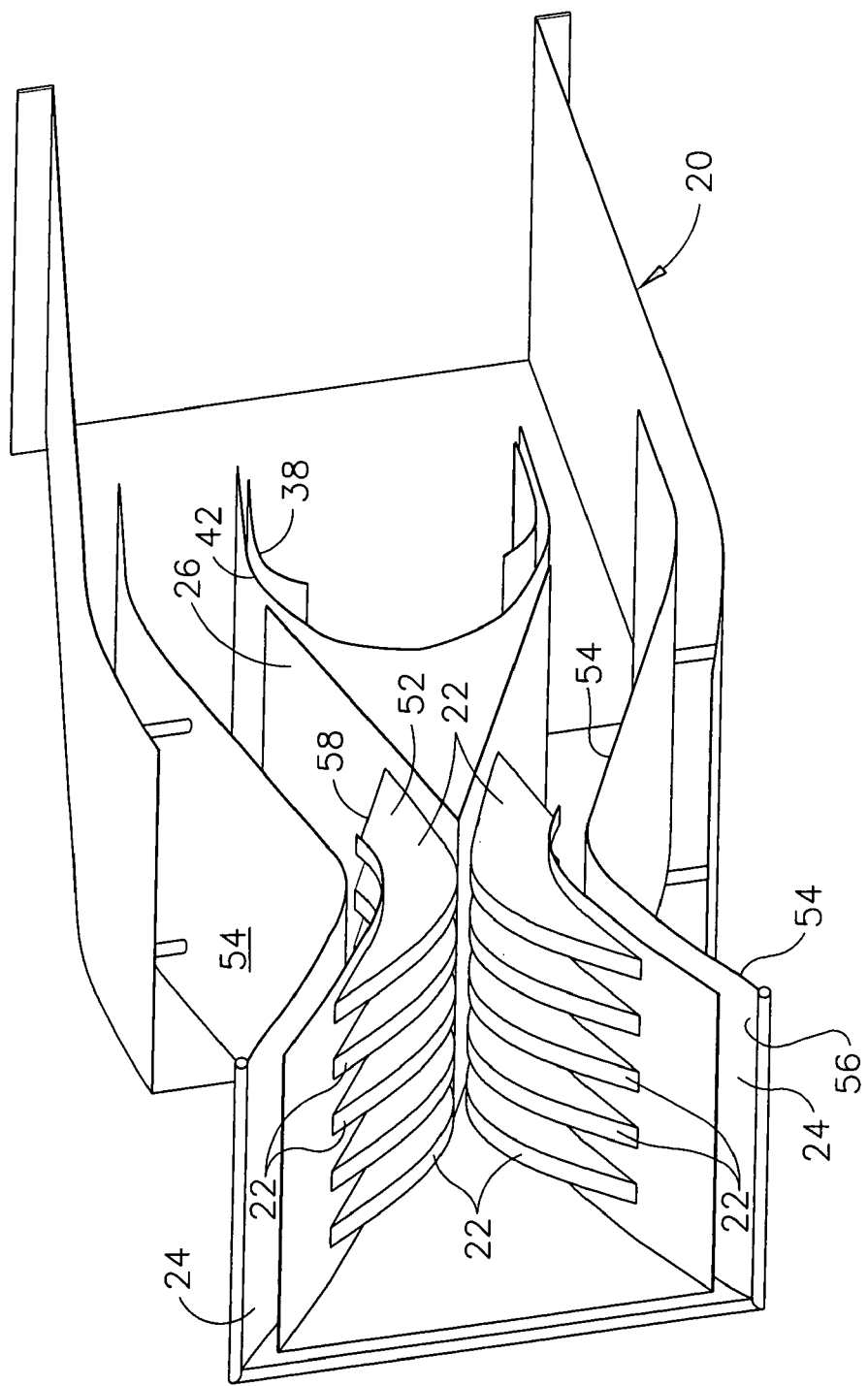
FIG. 8 is an isometric perspective centerline section in elevation through line 8-8 of FIG. 7.

FIG. 8 is a perspective centerline section in elevation through line 8-8 of FIG. 7. This section slices through two lobes 22, one above a horizontal centerline of stage II duct 16 and one below and shown at the right of the upper and lower lobe groupings. Since the bottom section of stage II duct 16 is a mirror image of the top section, the discussion here will be confined to the top section. The right-most upper lobes 22 shown in FIG. 8, is shown cut in half. Another section along line 9-9 shown in FIG. 7 goes through two lobes 22. This section is illustrated in FIG. 9.

Figure 9:
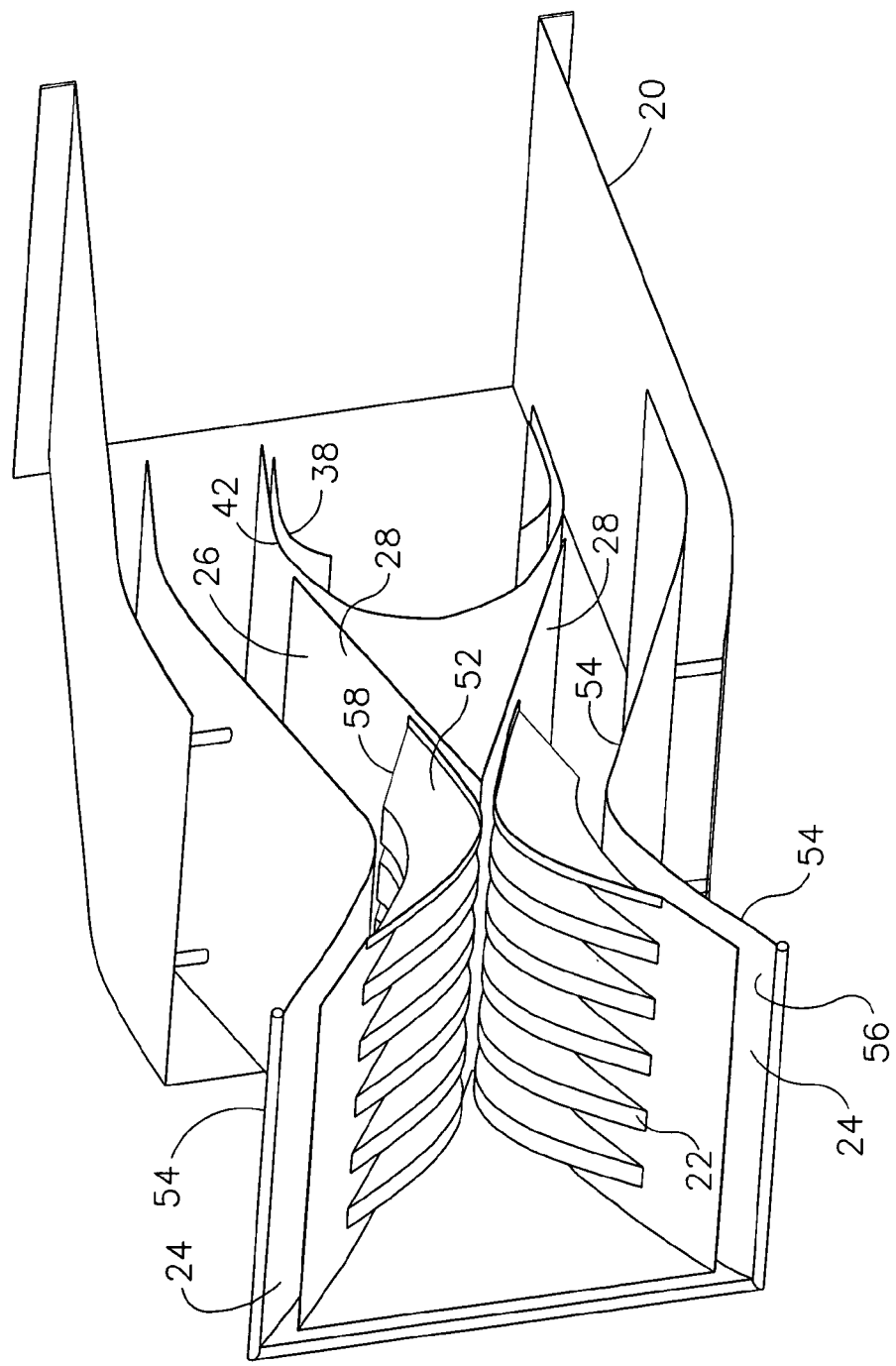
FIG. 9 is a section along line 9-9 shown in FIG. 7.

Referring to FIG. 9, flows of ambient outside ambient air are drawn into a gap 24 between a wall 56 of stage I duct 14 and an outer wall 54 of stage II duct 16. Cold ambient air is injected through this opening or gap 24, at least part of which expands into lobes 22. Hot exhaust air entering from the left side of FIG. 9 flows between the various lobes 22. Lobes 22 are hollow to allow cold air entering from gap 24 to pass into inlets 30 (not shown in FIG. 9, but shown in FIG. 10) through wall 56 of stage I duct 14 so that cold air is in lobes 22 as hot exhaust air passes between them. Ends 58 of lobes 22 are open to thereby exhaust the cold air drawn into lobes 22 into a duct between forward baffle 26 and outer wall 54 of stage II duct 16. While in lobes 22, the cold air is next to the hot exhaust stream, separated from it by lobe side walls 52.

Some ambient cold air not entering lobes 22 flows through gap 24 into a region between surfaces 28 of forward baffle 26 and wall 54. This flow is made clearer by reference to FIG. 10, which is a perspective view of a portion of stage II duct 16 looking down at inlets 30 with outer wall 54 of stage II duct 16 removed. Forward baffle 26 is also shown. Lobes 22 draw cold air from gap 24 through wall 56. Thus, when hot air flows F emerge to strike hot baffle 26, they are surrounded on two sides by cold air coming from lobe ends 58 and on the top (in the visible portion seen in FIG. 10) by cold air guided by segments 62 of wall 56, so that hot air flows F are surrounded on three sides by cold air. (At both the extreme left and right, a cold air flow directly from gap 24 replaces one of the cold air flows from lobe ends 58 around hot air flow F.) The hot air from flows F, the cold air from lobe ends 58 and the cold air riding over segments 62 hits and flows along the outside surface of hot baffle 26 and mixes.

Stage I duct 14 can be referred to as a "lobed mixer," because of the presence of lobes 22 and the mixing of cold ambient air in lobes 22 with the hot exhaust between lobes 22.

More particularly, hot exhaust gasses from an aircraft engine are directed into the lobed mixer of single baffle infrared suppressor 10, which includes a single baffle assembly comprising forward or hot baffle 26, cold baffle 42, and shields 38. The direction of hot exhaust from the engine in conjunction with cold air entering through gap 24 generates alternating flows of hot exhaust gas and cold air. These alternating flows are directed towards the single baffle assembly to mix the hot exhaust gas with the cold air to cool the emission from the engine to thereby reduce infrared emissions. The practical use of a single element baffle assembly in a single baffle infrared suppressor 10 is made possible by, among other things, the use of a lobed mixer. This mixer rapidly and effectively mixes engine bay cooling air in the engine exhaust with cold air to reduce or eliminate hot streaks, which are portions of unmixed engine exhaust air. These hot streaks are a strong plume signature contributor, a source of radiation heat transfer to stage II duct walls, and where it persists further into suppressor 10, a source of hot streaks in stage II or stage III walls. Hot streaks cause the exhaust plume to become a significant contributor to an IR signature at close range. In various configurations, an additional flow path of cold air guided in part by segments 62 between lobe inlets 30 is provided so that the hot exhaust flows are surrounded on three sides by cold air.

Figure 11:
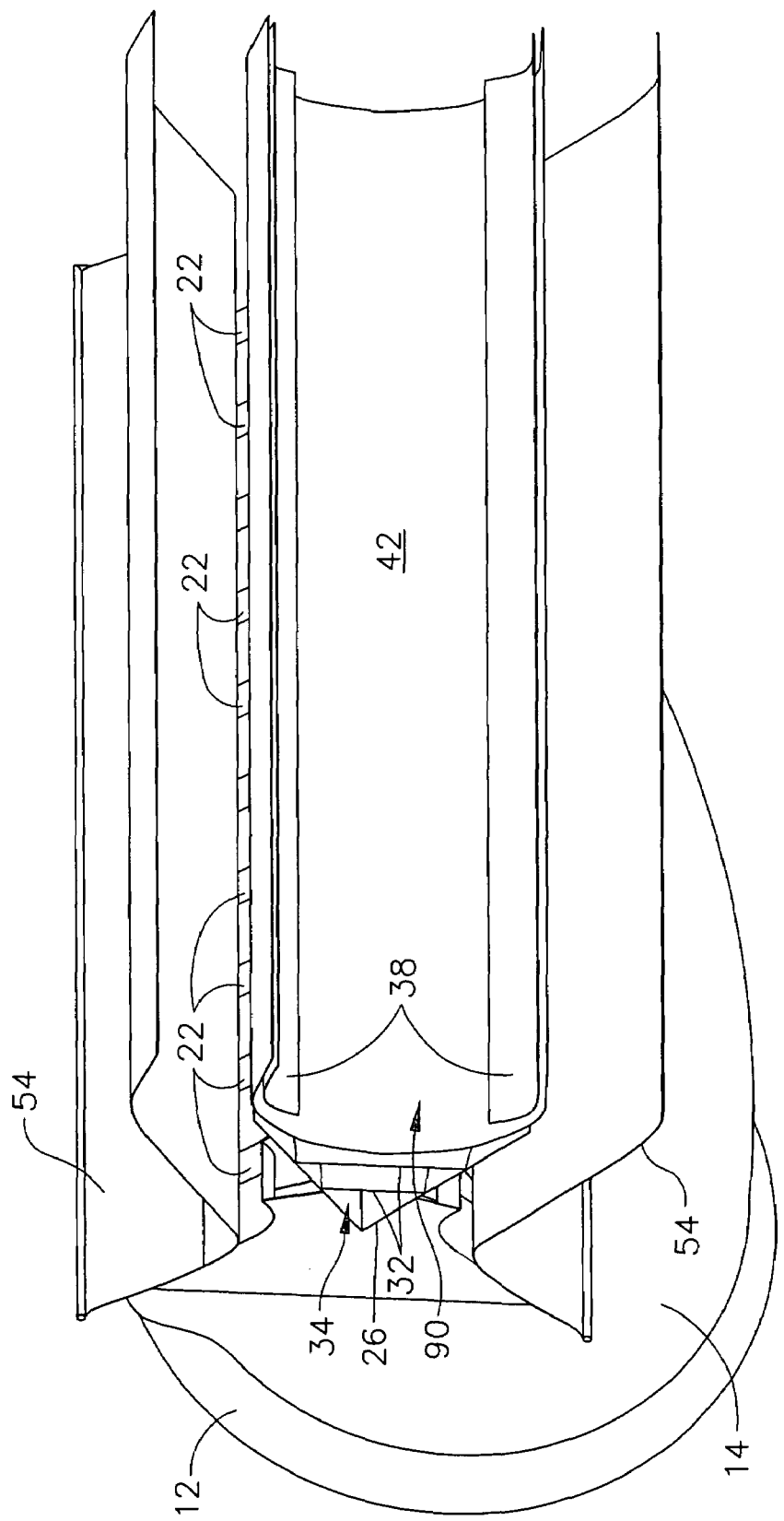
FIG. 11 is an oblique perspective view from the rear stage II duct and the stage I duct and the adapter ring of the infrared suppressor assembly of FIG. 1, but omitting the stage III duct and some connecting standoffs that support various structures within the infrared suppressor assembly.

FIG. 11 is an oblique perspective view from the rear stage II duct 16 and stage I duct 14 and adapter ring 12, but omitting stage III duct 20 and some connecting standoffs that support various structures within infrared suppressor 10. Shields 38 and cold baffle 42 entrain some cool air as seen from this view as does void 34 behind forward baffle 26. These cool surfaces and cool air shield the hot exhaust gas flow A and hot surfaces within suppressor 10 from the view of infrared sensors looking up into stage III duct 20. In addition, cool air flowing over cold baffle 42 (i.e., over the top, or under the bottom mirror image portion) is also mixed with hot exhaust air so that only relatively cool air is seen leaving stage III duct 20.

Figure 12:
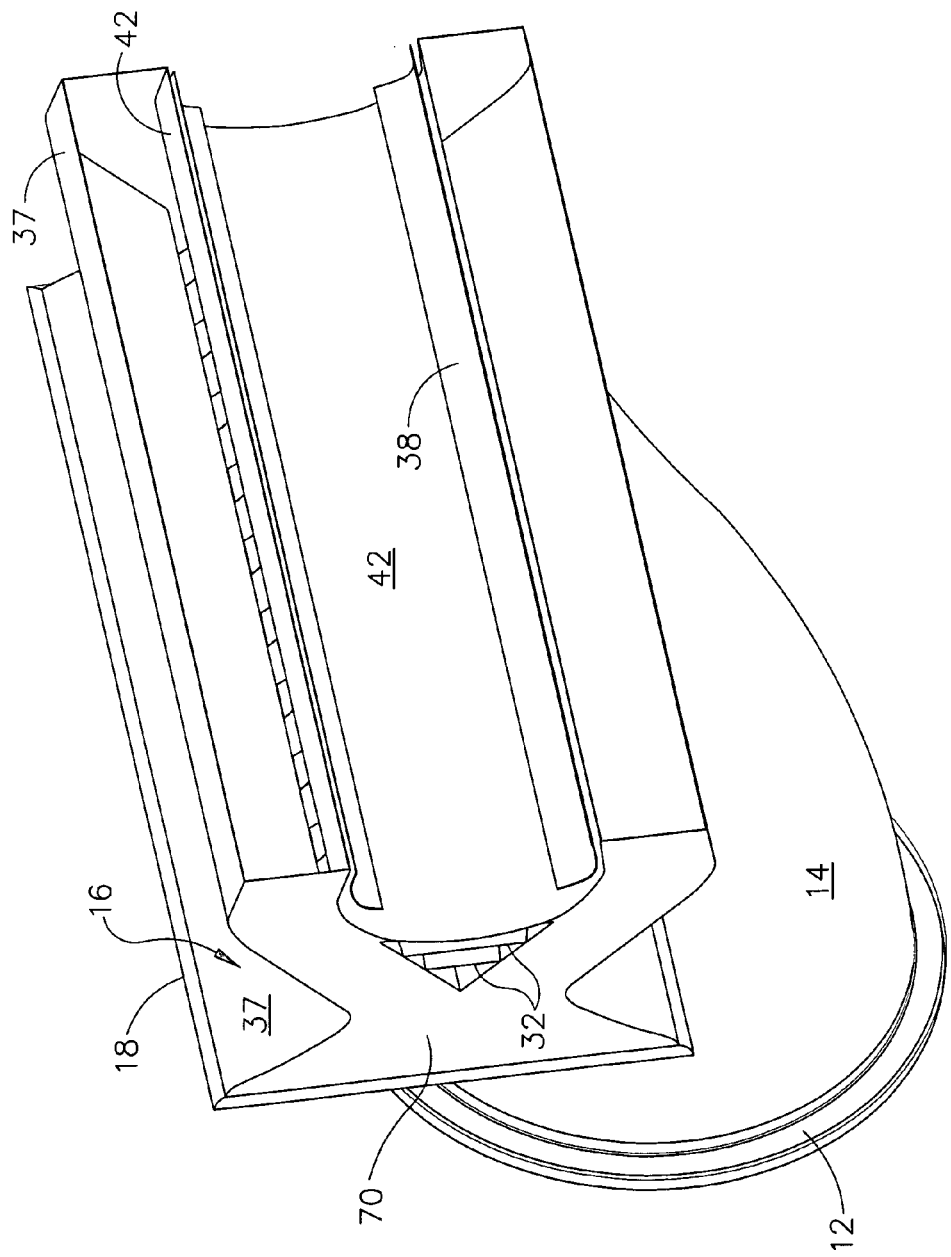
FIG. 12 is a figure similar to FIG. 11 but also shows a side wall having a flow guide as shown in FIG. 5.

FIG. 12 is similar to FIG. 11 but also shows a side wall 70 having a flow guide 32 as shown in FIG. 5. Flow guide 32 scoops in cold ambient air that is in front of the flow guide so that it enters and cools a recess inside cold baffle 42.

Figure 13:
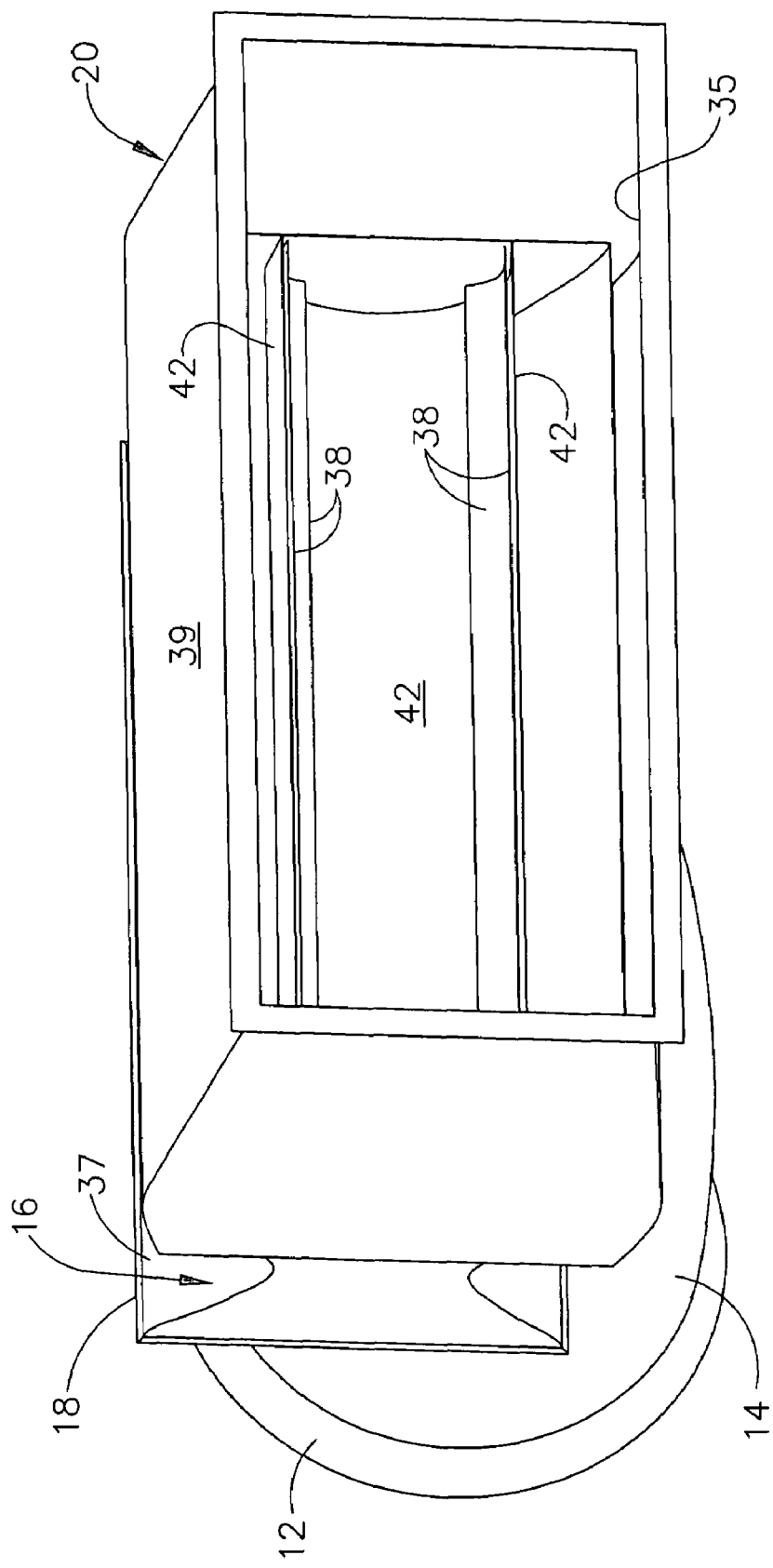
FIG. 13 is a rear perspective view of a fully assembled infrared suppressor assembly of FIG. 1, showing that hot surfaces and hot air flows within the suppressor assembly are effectively shielded from view from infrared sensors that look into the stage III duct or at the sides of suppressor 10.

FIG. 13 is a rear perspective view of a fully assembled suppressor 10, showing that hot surfaces and hot air flows within suppressor 10 are effectively shielded from view from infrared sensors that look into stage III duct 20 or the sides of suppressor 10.

To summarize, a flow of hot exhaust air flows into stage I duct 14, and is split into two flows B and C after going through a mixer that comprises stage II duct 16. Cold air is injected or entrained into the hot air stream, slowing down and cooling the air, as well as increasing the mass flow (by about 50% in some configurations). Surfaces of forward baffle 26 become hot, so a second injector comprising a cold air inlet 33 injects additional cold air to cool inner surfaces of suppressor 10 and shield hot surfaces from visibility. Additionally, forward baffle 26 is shielded from view from the back end of suppressor 10 by cold baffle 42 and shields 38. Cold air entering from voids 34 is distributed laterally, and cools cold baffle 42. Thus, when infrared suppressor assembly 10 is viewed from any direction, there is very little or no hot air or hot surface area visible. In addition to being very effective at suppressing infrared emissions, assembly 10 is also relatively simple and low weight.

A purged air flow P comes from the left and right sides through a gap 24 as viewed from the vantage point of FIG. 1 (only a right side gap 24 is shown in FIG. 1). Also, referring to FIG. 3, a cold air flow D also enters at 33. Some of air flow D turns and flows into void 34 between surface 28 and cold baffle 42. Also, some of air flow D flows into void 90 and between shield 38 and cold baffle 42 to create a cold air pool behind cold baffle 42. Some cold air from flow P also enters into void 34 and behind cold baffle 42 from the open sides hot baffle 26 and cold baffle 42.

Figure 10:
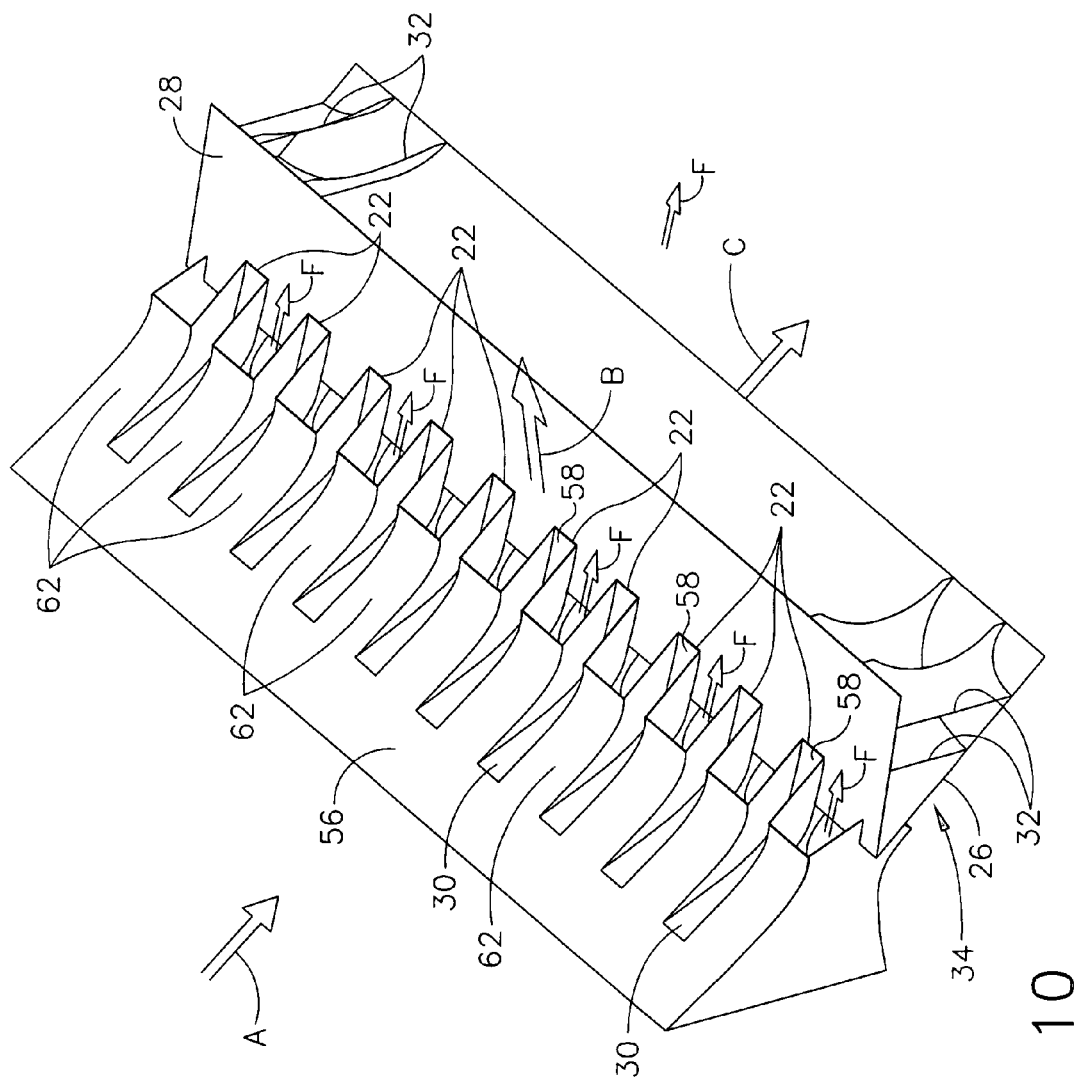
FIG. 10 is a perspective view of a portion of the stage I and II ducts shown in FIG. 6 looking down at an inlet with the outer wall of the stage II duct removed.

A cooling dilution flow is increased by controlling the size of areas of flow through suppressor 10. For example, the exit of stage I duct 14 is smaller and has one or more relatively large gaps 24 for cold air to enter. Discrete rectangles of hot and cold gasses (i.e., the hot air flows F and the cold flows through gaps 62 and exiting at lobe exits 58) are sized so that the hot gas that comes through is in a relatively small interlobe gap. The rectangles having the hot gas are narrowly sized (as is shown in FIG. 10) to increase the cooling flow. The amount of hot gas through the open area is selected to achieve a cooling/dilution flow ratio of approximately 1.5:1. Standard calculations based on fluid dynamic principals can be used to select the sizes.

The flow of gasses through suppressor 10 is also contoured. Whereas known prior art suppressors had a stage II duct 16 barely fitting into a stage III duct 20, some configurations of the present invention have a stage III duct 20 that parallels stage II a much longer distance. In this manner, stage III duct 20 thus has an extended inlet flowpath through gap 33. In the known prior art configurations, for example, the amount that stage II duct 16 fits into stage III duct 20 is just enough to allow the ducts to stay put when connected with spacers. A substantially greater overlap is provided to improve cooling of stage II walls 37.

In various configurations of the present invention, a coating, or combination of coatings, is used on surfaces to further suppress infrared radiation. Any suitable coating may be used, including black spray paint. However, increased durability and performance may be achieved with other coatings, including various proprietary and non-proprietary coatings known in the art for use with suppressors.

The total angle of the bend in curved stage I duct 14 in some configurations of the present invention is at least about a 15 degree change in the axis from adapter ring 12 and gap 24. This bend results in the axis of suppressor 10 being about 15 degrees tilted with respect to an attached engine. In some configurations, the angle of the bend and the tilt can be as high or higher than 30 degrees. From gap 24 aft, some configurations (not shown in the Figures) provide additional curvature. The bending of the axis of suppressor 10 is not required in all configurations of the present invention, and can be provided at various angles dependent upon the aircraft on which suppressor 10 is to be used. In general, the bend is limited in that suppressor 10 has to fit the aircraft engine and structure. In some configurations, the bend is away from the fusilage of the aircraft.

It will thus be evident that configurations of the present invention provide improved protection against threats even with increased engine exhaust gas temperatures and requirements for increased power and reduced overall weight. In particular, the lobed mixer rapidly and effectively mixes engine bay cooling air into the engine exhaust to reduce or eliminate hot streaks that otherwise would be a strong plume signature contributor, a source of radiation heat transfer to the stage II walls, and even a generator of hot streaks in the stage II and stage III walls. The lobed mixer thus has a significant benefit on IR signature reduction. The use of shields 38 also reduce the signature from slightly above and below the suppressor axis in a purged air space. In some configurations, overall cooling/dilution flow is significantly increased to 1.5:1, resulting in significantly reduced plume temperatures to reduce plume signature, suppressor core heat load, and aircraft fuselage heat load. In addition, an extended and contoured inlet flowpath provides a more uniform stage III cooling film and "backside" cools the stage II wall. In configurations in which the suppressor axis is realigned outboard, the suppressor exhaust is directed further outboard to prevent its washing the aft fuselage, resulting in a significant signature reduction from the aircraft.

In yet other configurations of the present invention, instead of a fixed baffle configuration represented by FIGS. 1-13, a variable geometry kinematic baffle configuration is provided that translates and/or collapses. Also, some configurations provide a deflector hood and a lower panel coordinated with the kinematic baffle. In these configurations of the present invention, provide different modes of operation. For example, a first mode is provided in which infrared suppression is achieved by blocking a direct view of an exhaust cavity using a cold shield. Also, a second mode is provided in which the baffle is opened up at a downstream end of stage I to increase pumping and blocking a line-of-sight into an attached engine. In addition, a third mode is provided in which the baffle assembly is in a collapsed position to reduce or minimize stage I backpressure. Modes can be changed in some configurations as commanded by the pilot, a Full Authority Digital Engine Control (FADEC), or a missile warning receiver (MWR). For example, the first mode could be commanded automatically in the event of a missile launch. The second mode could be commanded in other hostile environments. The third mode can be commanded in non-hostile environments, in situations in which one engine is inoperative, or in cases in which a limiter temperature is reached.

Figure 14:
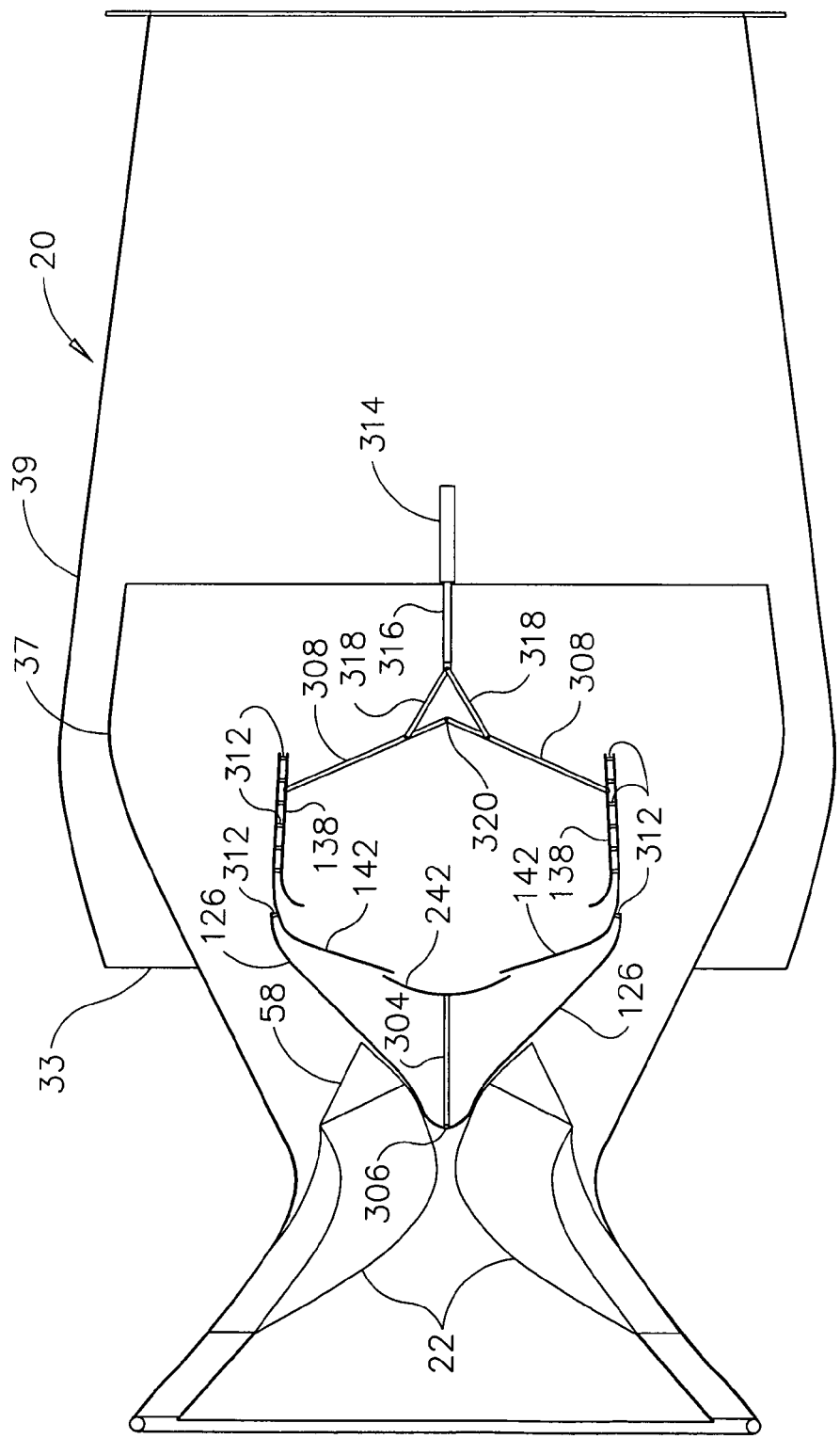
FIG. 14 is an upright, vertical section view in elevation through the middle of the infrared suppressor assembly shown in FIGS. 1 and 2, but with the stage I duct 14 omitted the forward or hot baffle replaced with a collapsible and translatable baffle.

More particularly, FIG. 14 is an upright, vertical section view in elevation through the middle of infrared suppressor assembly 10 shown in FIGS. 1 and 2, but with portions of stage I duct 14 omitted. In comparison to the configuration represented in FIG. 3, the configuration represented in FIG. 14 replaces forward or hot baffle 26 with a collapsible and translatable baffle 126. In some configurations, a piano hinge 306 or other suitable hinge is provided to make baffle 126 collapsible. In cold baffle parts or members 142 and a cold baffle nose 242, the latter being attached to collapsible and translatable baffle 126 by one or more struts 304.

Figure 15:
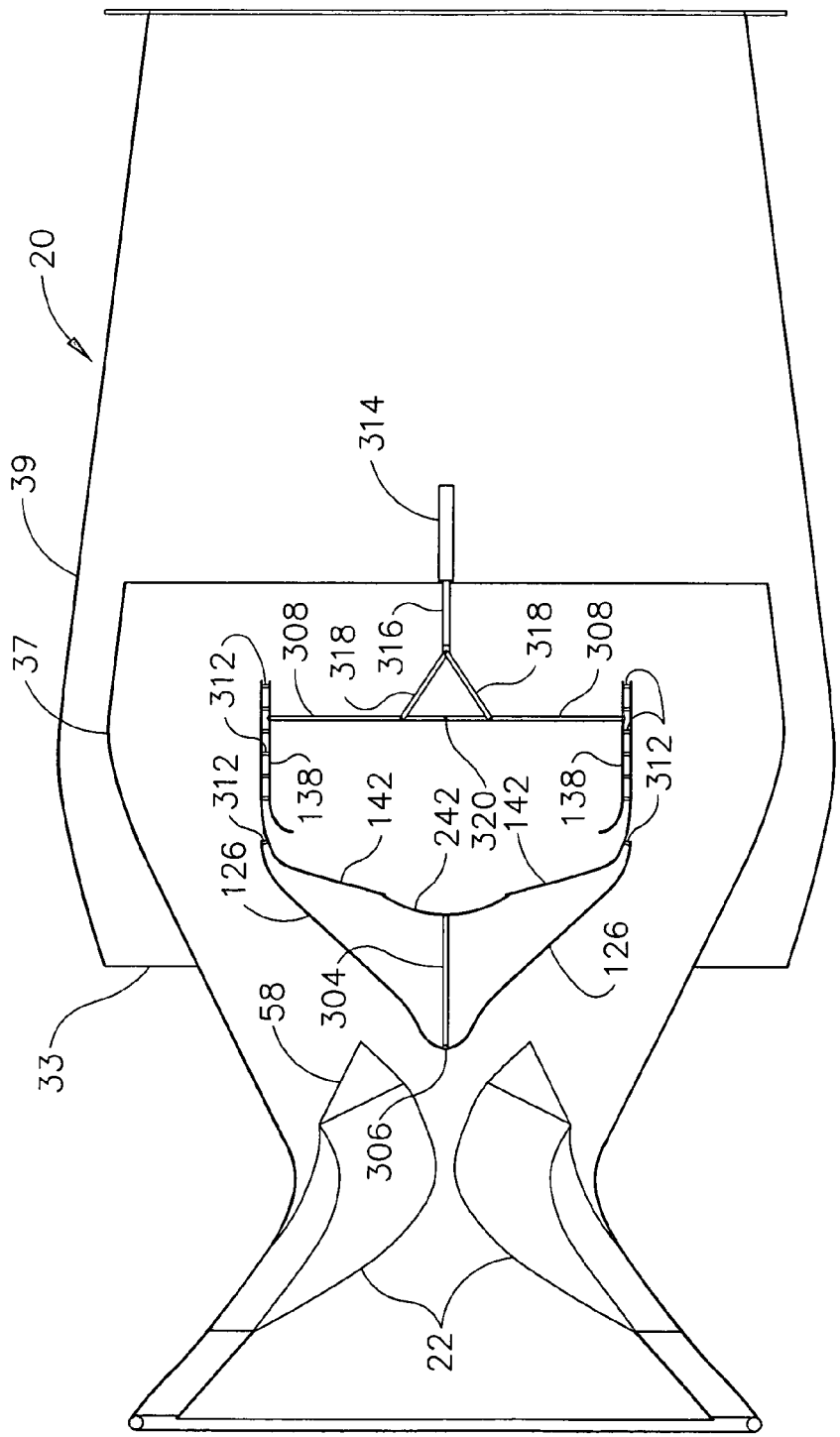
FIG. 15 is an upright, vertical section view similar to that of FIG. 14, but with the collapsible and translatable baffle partially retracted.
Figure 16:
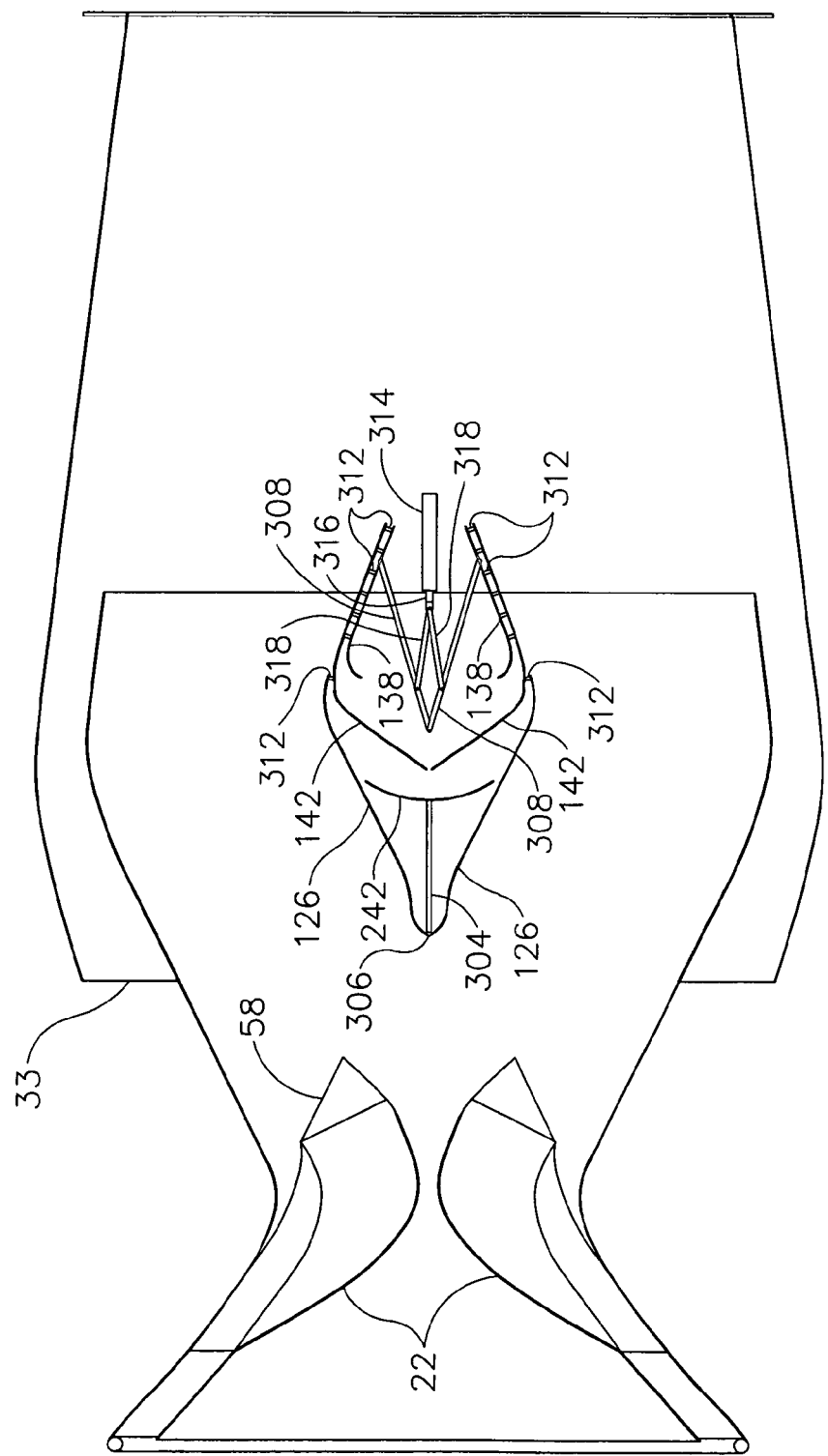
FIG. 16 is an upright, vertical section view similar to that of FIG. 14, but with the collapsible and translatable baffle in its fully retracted and collapsed state.
Figure 17:
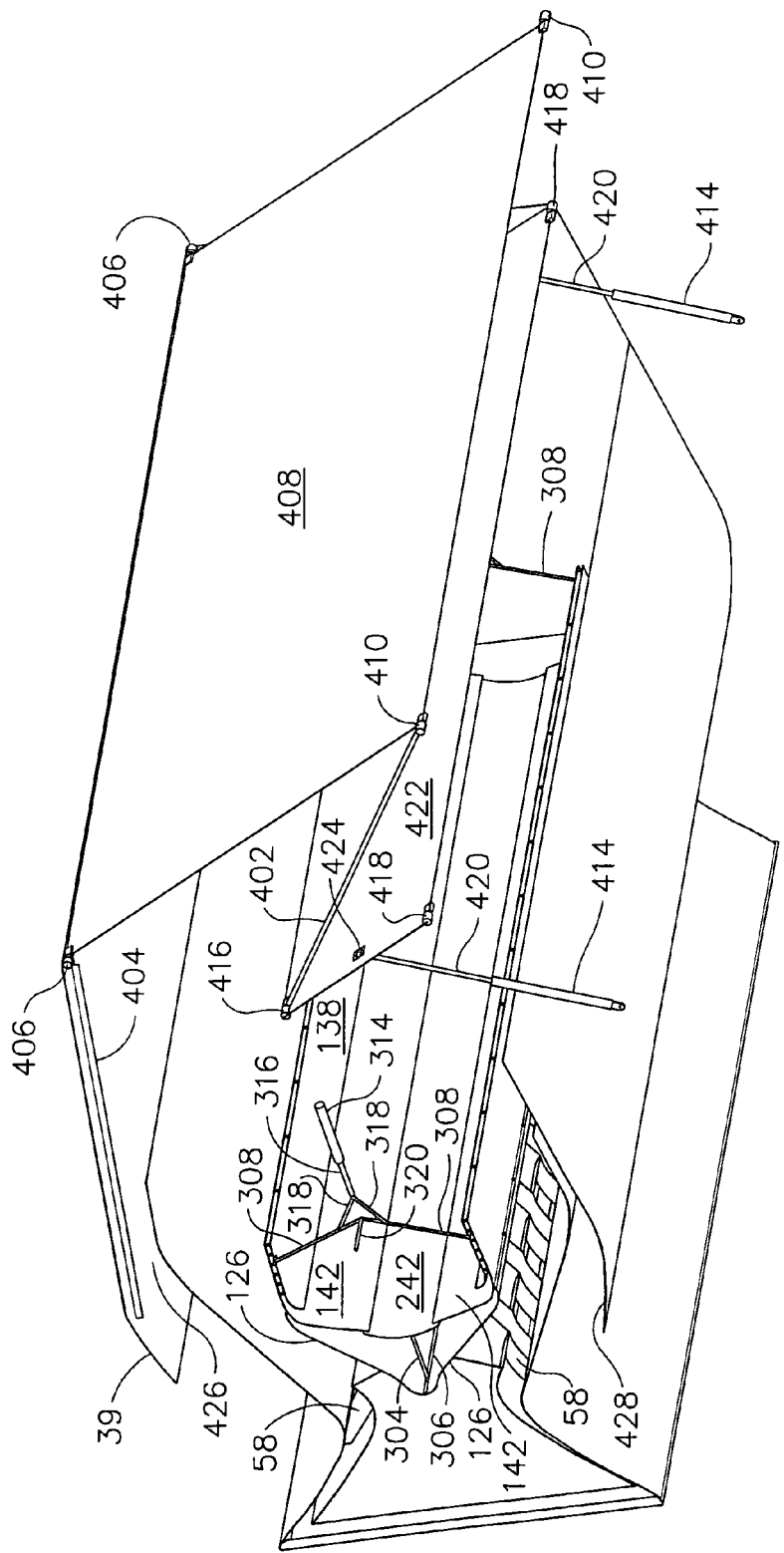
FIG. 17 is a view of internal portions of an infrared suppressor assembly similar to that of FIG. 14, but also having moveable deflectors. The deflectors are shown in a fully deployed position.

Shields 38 are replaced by similar shields 138 that differ from shields 38 in that shields 138, or cold baffle 142, are attached to rods 308 that join at a pivot or hinge axle 320 (better seen in FIG. 17). Shields 138 are attached to cold baffle parts 142 by, for example, a plurality of spacers or bolts 312. Similar attachment members 312 are used in some configurations to attach collapsible baffle 126 to cold baffle parts 142. A suitable actuator, for example, a piston comprising a cylinder 314 having a moveable piston rod 316, is mechanically coupled to rods 308 via rod rotating members 318, so that retraction or extension of piston rod 316 (or movement of any other suitable actuator) results in rotation of rods 308 around axle 320. Rod 316 is shown in its fully extended position in FIG. 14. Partial retraction results in a rotation of rods 308 that retracts collapsible baffle 126 from lobes 22, as illustrated in FIG. 15. This retraction also pulls back cold baffle parts 142, but the cold baffle remains intact as cold baffle nose 242 is pushed back by strut 304. As illustrated in FIG. 16, further retraction of cylinder 316 causes collapsible baffle 126 to retract further from lobes 22 and to collapse into a fully collapsed state. FIGS. 14, 15, and 16 correspond, respectively, to the first mode of operation, the second mode of operation, and the third mode of operation. In the first mode, baffle 126 is partially collapsed and translated forward to maintain bay and dilution flow pumping. In the second mode, baffle 126 is fully expanded to block hot engine parts. In the third mode, baffle 126 is fully collapsed and translated aft for minimal backpressure.

The amount of height change and direction of translation are different for the first and third mode. Some configurations, provide variability in stage III duct 20 using a moveable deflectors comprising hood 408 and lower panel 422, and/or an upper panel, as shown in FIG. 17. A coordinated movement is accomplished using a link bar or rod 402 that rotates lower panel 422 as deflector hood 408 is actuated aft. Because deflector hood 408 is insulated, hood 408 does not become a significant infrared source as hood 408 is heated by the flow of exhaust gases flowing therepast. Various configurations of the present invention provide both collapsible and translatable baffle hardware as well as moveable deflectors, and some of these various configurations coordinate the movement of the deflectors and the collapsible and translatable baffle hardware.

FIG. 14 corresponds to the first mode in which infrared suppression is achieved by blocking a direct view of an exhaust cavity using a cold shield that comprises cold baffle parts 142 and cold baffle nose 242. Aerodynamically, and referring to FIG. 17, infrared suppressor 10 is effectively an ejector that is followed by a flowpath bend, in some configurations in which an additional hood 408 and panel 422 are provided. Flow deflector hood 408 is translated aft and rotated down, and lower panel 422 is rotated into a turning vane position, by extension of piston rods 420 that attach to attachment points 424 from piston cylinders 414 or by another suitable actuator or actuators that provide equivalent translation and rotation motions. This mode results in a large infrared signature reduction compared to conventional infrared suppression levels. For example, a significant reduction from conventional infrared suppression levels is achieved in some configurations in the first mode when hood 408 and panel 422 are used in conjunction with the collapsible, translatable baffle.

In the second mode, collapsible baffle 126 is opened up at a downstream end of stage I duct 14 to increase pumping and blocking a line-of-sight into an attached engine (not shown in the Figures). This second mode provides protection in a hostile environment without incurring all of the penalties of the redirected flowpath of the first mode. In some configurations, an approximately 74% infrared signature reduction from conventional infrared suppression levels is achieved at tail-on, and an approximately 71% infrared signature reduction at side view.

Figure 18:
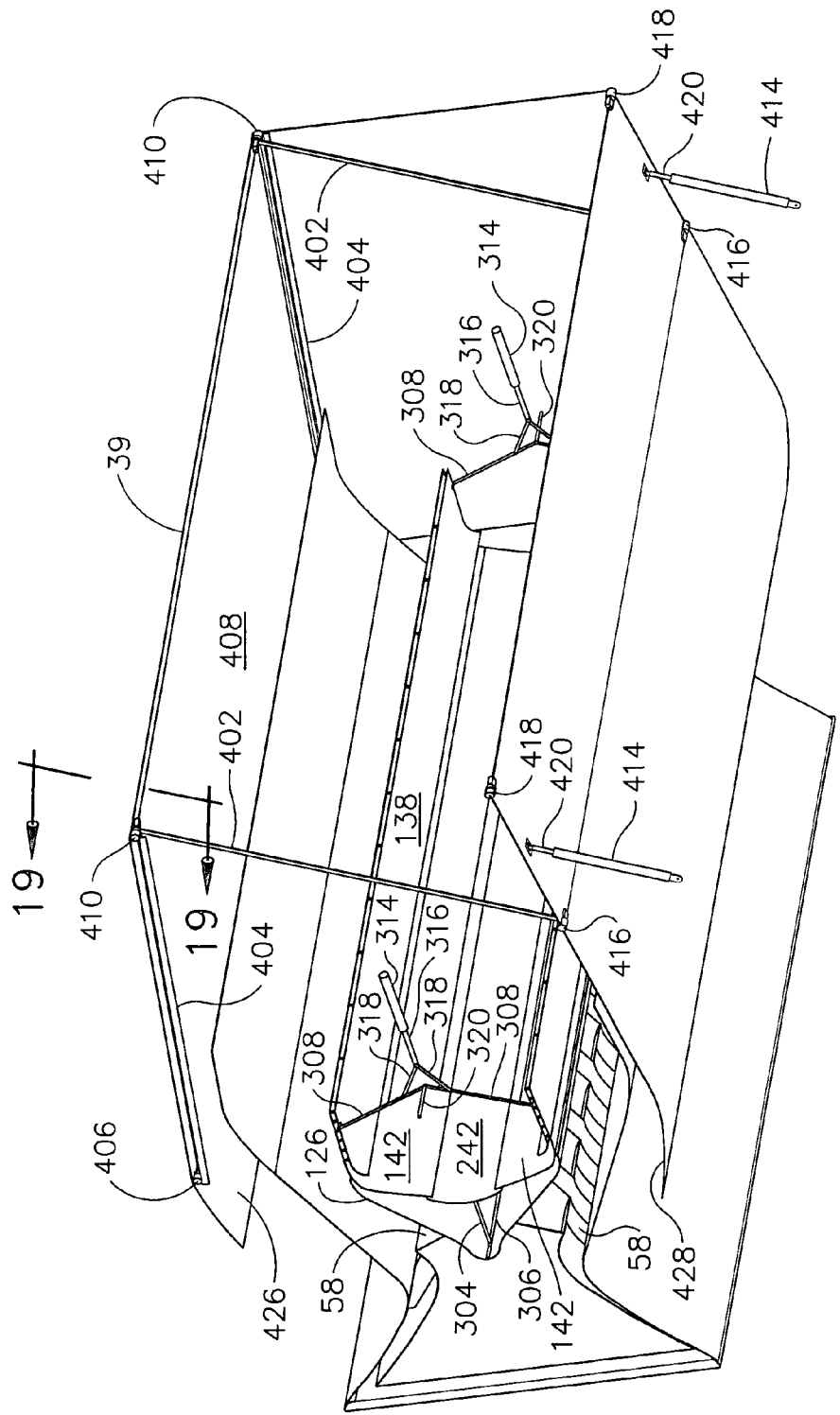
FIG. 18 is a view of the internal portions of the infrared suppressor assembly of FIG. 17, but with the deflectors stowed.

In the third mode, an unsuppressed, low backpressure mode is achieved by actuating collapsible baffle 126 to its collapsed position (as shown in FIG. 16) to reduce or minimize stage I duct 14 backpressure. The stage III duct 20 walls are aligned axially. Shaft horsepower is effectively increased or even maximized with reduced blockage by baffle 126. Additionally in some configurations, drag is reduced or minimized because flow is discharged along a centerline of suppressor 10. Referring to FIG. 18, this reduction in drag is reduced by a retraction of piston rods 420 into piston cylinders 414 (or by another suitable actuation system), resulting in panel 422 becoming flush or essentially flush with a top side 428 of stage III wall 39 and hood 408 becoming flush with a bottom side 426 of stage III wall 39, with panel 422 forward rollers 416 and aft rollers 418 positioned as shown in FIG. 16, and hood aft roller 410 engaging z-rail 404.

FIG. 18 does not show collapsible baffle 126 in its collapsed position as shown in FIG. 16, because movement of baffle 126 can be independent of flow deflector hood 408 and lower panel 422 in some configurations.

In the third mode, infrared suppression apparatus 10 is providing substantially the same exhaust configuration as a conventional IR suppressor, but with the baffle removed, which can provide installed engine performance slightly better than the that of an unsuppressed engine.

More particularly, in the third mode, deflector hood 408 and panel 422 are essentially oriented axially with respect to suppressor 10 to direct flow aft. In the first mode, however, deflector hood 408 and panel 422 are repositioned and/or rotated to turn the exhaust flow.

Figure 19:
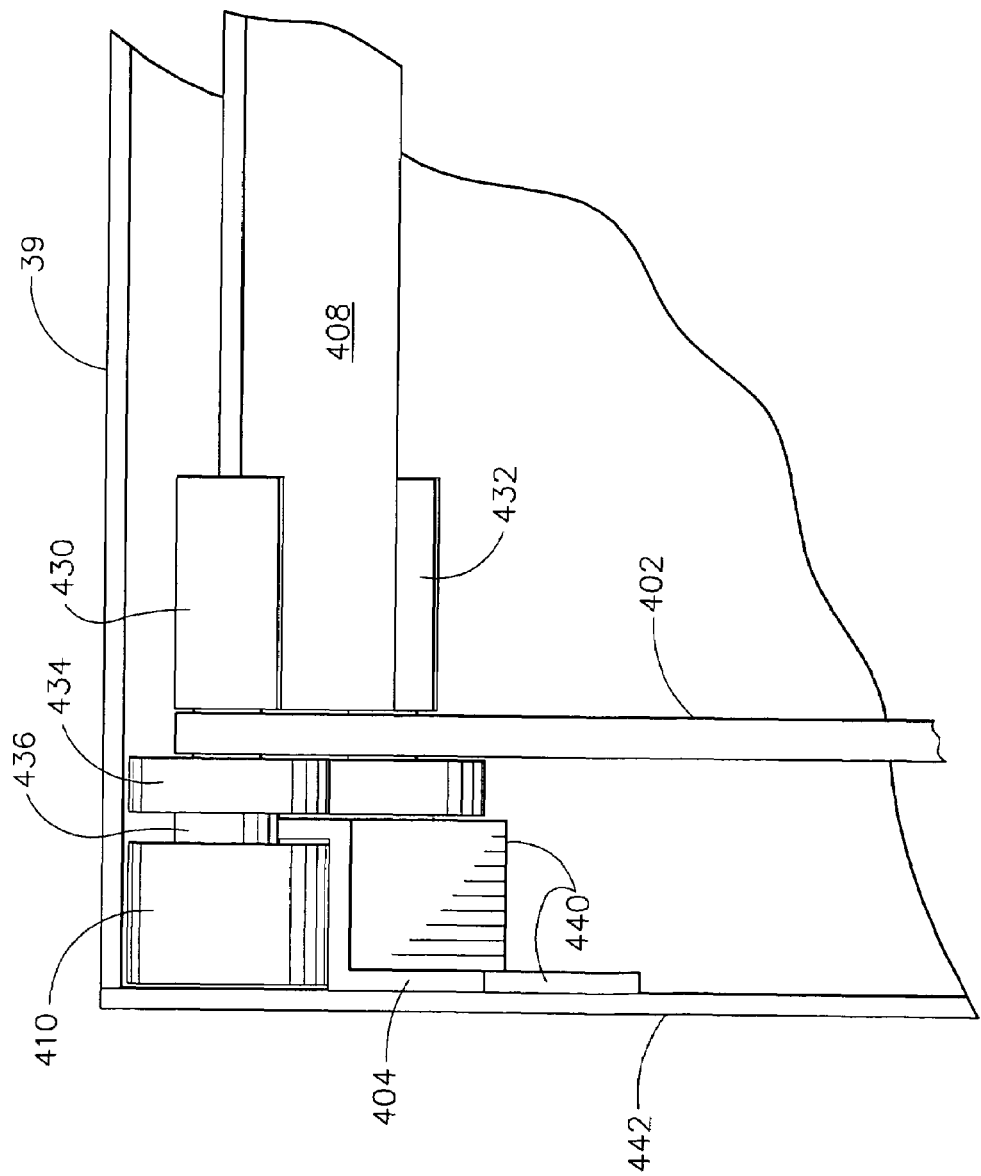
FIG. 19 is a partial detail view showing a roller assembly of the deflector hood used with the infrared suppressor assembly.

FIG. 19 is a detail view looking into suppressor 10 as shown by arrows 19-19 in FIG. 18. FIG. 19 shows how, in some configurations, roller 410 is attached, via a shaft 436, to an aft attachment 430 on hood 408. Link bar or rod 402 is also attached to hood 408 between aft attachment 430 and spacer 434. Roller 410 sits and rolls on z-rail 404 during at least a portion of its movement. Roller 406 (not visible in FIG. 19, as it is hidden by z-rail 404 bottom 440, although front attachment 432 is visible in FIG. 19) rolls between wall 39 and z-rail 404 throughout its range of motion. Roller Z-rail 404 is attached to a side 442 of stage III wall 39. Side 442 is omitted from FIGS. 17-18 to allow viewing of the inside of stage III duct 20.

Figure 20:
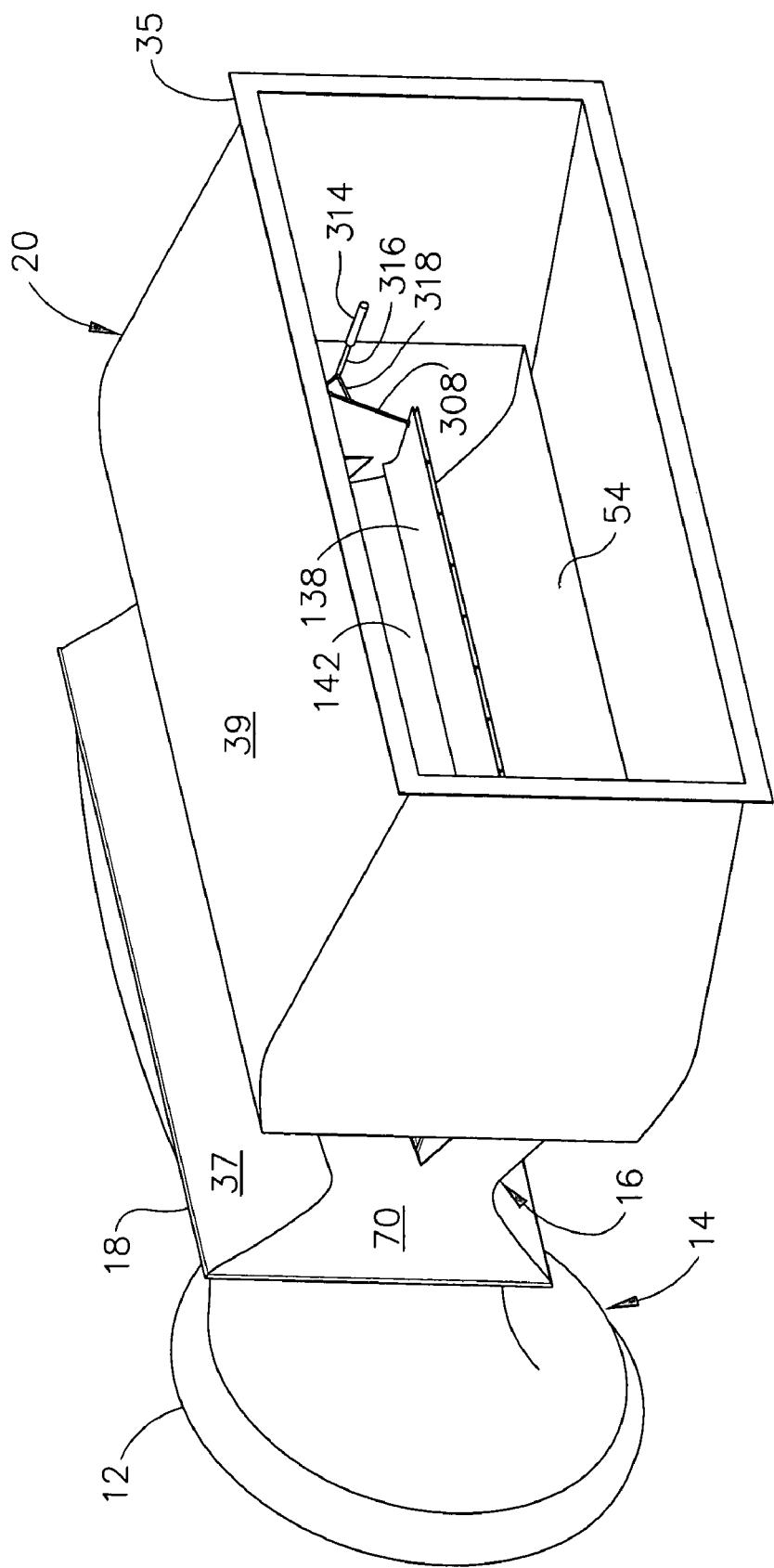
FIG. 20 a rear view of an infrared suppression apparatus similar to that of FIG. 14, showing what would be seen looking into its exhaust end.
Figure 21:
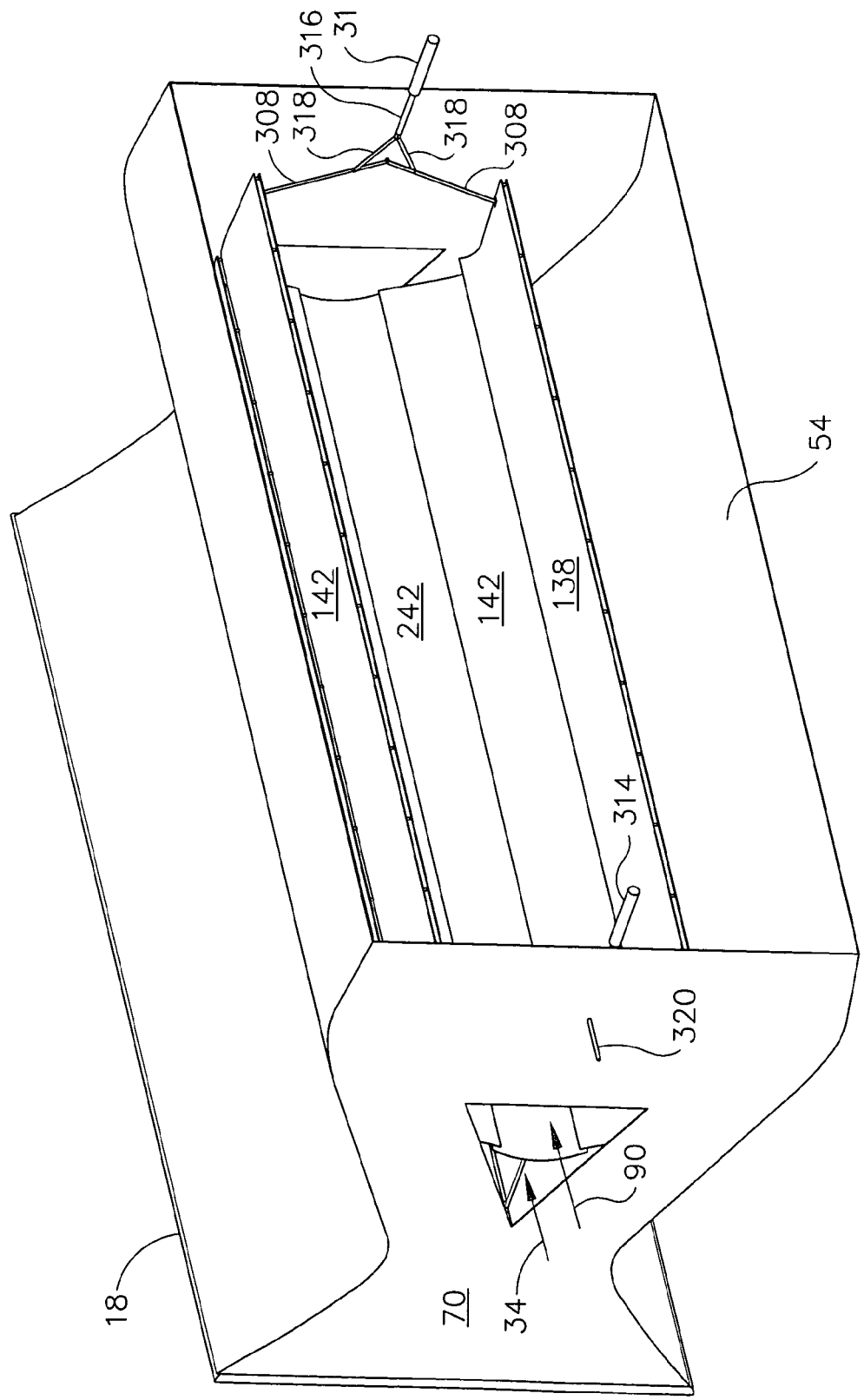
FIG. 21 and 22 are perspective view of the stage III duct of the infrared suppression apparatus of FIG. 20 in different stages of disassembly to show internal components thereof.
Figure 22:
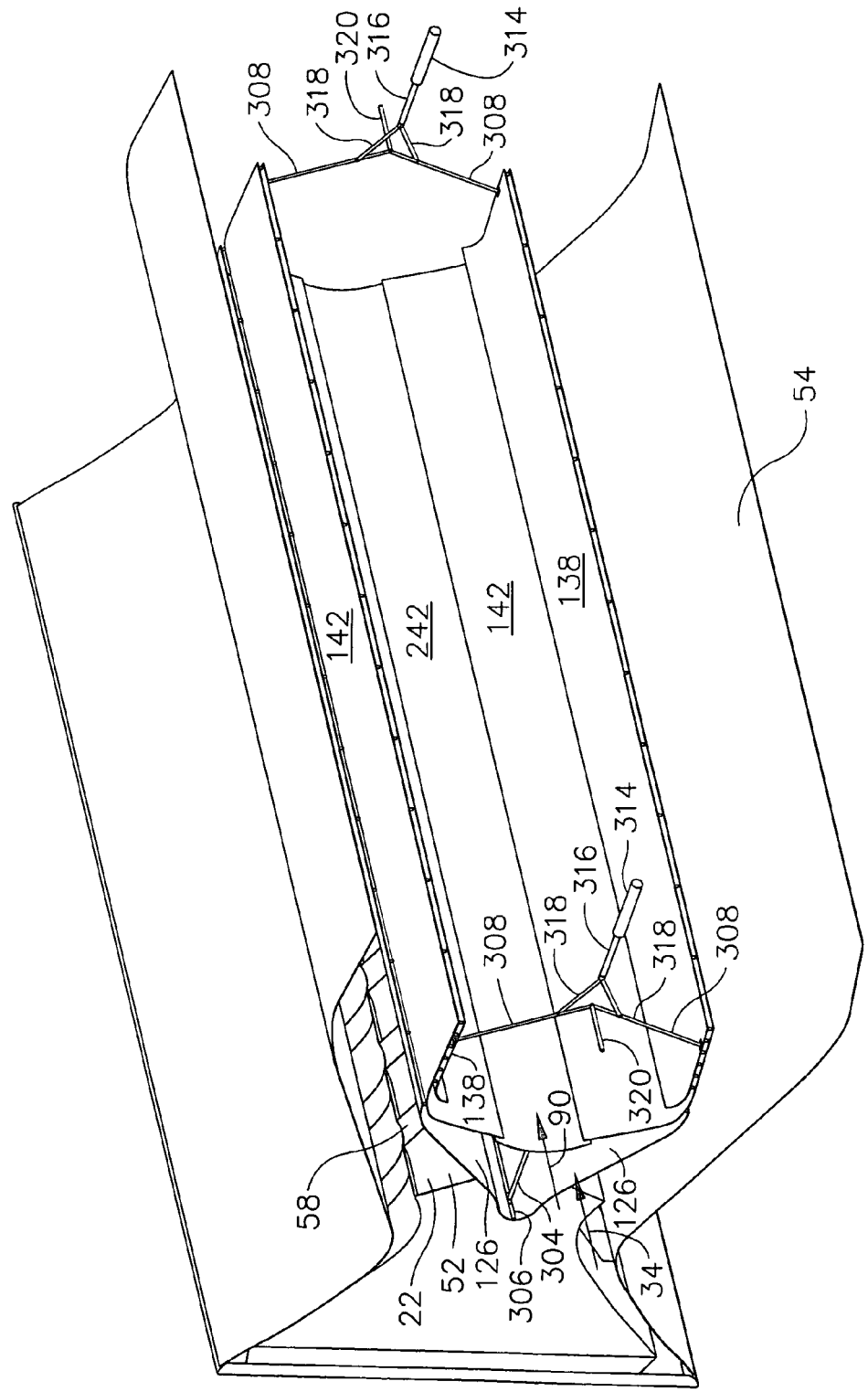

FIG. 20 is a rear view of an infrared suppression apparatus 10 that is representative of what is seen looking into the exhaust end of apparatus 10. FIGS. 21 and 22 are perspective views of stage III duct 20 in different stages of disassembly to allow internal components to be shown. The configuration shown in FIGS. 20 to 22 does not include the hood and panel assembly shown in FIGS. 17 to 19.

In various configurations of the present invention, mode selection can be selected manually by a pilot, automatically by a combination of a Full Authority Digital Engine Control (FADEC) and threat warning sensors, and/or by a combination of the foregoing.

In some configurations, the second mode provides a single element baffle 126 that eliminates characteristically higher temperatures of suppressors having multiple baffles. The lobed stage I duct exit mixer eliminates plume hot streaks, and the lobes are hidden from line of sight by the single element baffle. An increased bypass ratio of from about 0.8 to 1 to about 1.5 to 1 is provided for reduced hot metal and external plume signature. In some configurations, titanium metal is used in the construction of suppressor 10 for weight reduction. Also, suppressor 10 is aligned 15 degrees further outboard to reduce fuselage heating. Moreover, in other embodiments, a coating or suite of coatings may be applied to enhance the device's emission suppression capabilities.

It will thus be appreciated that configurations of the present invention provide considerable IR suppression of engines when required for survivability, while providing the capability to minimize loss of performance, payload capability, and/or range in more benign environments. In particular, the first mode provides for high IR suppression in hostile environments, mode two provides some blockage of engine hot parts, whereas the third mode provides high performance for benign environments.

While the invention has been described in terms of various specific embodiments, those skilled in the art will recognize that the invention can be practiced with modification within the spirit and scope of the claims.

What is claimed is:

1. A method for suppressing infrared radiation from an engine of an aircraft operating in an environment, said method comprising:
   directing hot exhaust from the aircraft engine into a lobed mixer of a single baffle infrared suppressor having a collapsible, translatable baffle to generate alternating flows of hot exhaust gas and cold air; and
   directing the alternating flows of hot exhaust gas and cold air towards the collapsible, translatable baffle to mix the hot exhaust gas with the cold air.

2. A method in accordance with claim 1 further comprising collapsing and translating the baffle depending upon a threat level of the environment of the aircraft.

3. A method in accordance with claim 2 wherein said collapsing and translating the baffle depending upon a threat level of the environment of the aircraft further comprises selecting between a first mode in which a direct view of an exhaust cavity is blocked, a second mode in which the baffle is opened up to increase pumping and blocking of a line-of-sight into the engine, and a third mode in which the baffle is collapsed to reduce or minimize backpressure.

4. A method in accordance with claim 2 further comprising positioning a hood and a panel of the infrared suppressor in accordance with the threat environment.

5. A method in accordance with claim 4 wherein said collapsing and translating the baffle depending upon a threat level of the environment of the aircraft further comprises selecting between a first mode in which a direct view of an exhaust cavity is blocked, a second mode in which the baffle is opened up to increase pumping and blocking of a line-of-sight into the engine, and a third mode in which the baffle is collapsed to reduce or minimize backpressure.

6. A method in accordance with claim 5 wherein, in said first mode, said hood and said panel are positioned, rotated, or both to turn the exhaust from the engine.

7. A method in accordance with claim 1 further comprising positioning a hood and a panel of the infrared suppressor in accordance with the threat environment.

8. A method in accordance with claim 7 further comprising at least one of positioning or rotating said hood and said panel to turn the exhaust from the engine.

9. A method in accordance with claim 1 further comprising selecting a mode of operation from a set of modes including a first mode in which a direct view of an exhaust cavity is blocked, a second mode that pumps and blocks a line-of-sight into the engine, and a third mode in which backpressure is minimized or reduced.

10. An infrared suppressor for suppressing infrared radiation from an engine of an aircraft operating in an environment, said infrared suppressor comprising:
    a stage I duct configured to direct hot exhaust from the aircraft engine towards a stage II duct;
    a gap around the stage I duct configured to channel a flow of cold air towards said stage II duct; and
    a lobed mixer of a single baffle assembly having a collapsible, translatable baffle positioned in said stage II duct, said single baffle assembly configured to generate alternating flows of hot exhaust gas and cold air.

11. An infrared suppressor in accordance with claim 10 further configured to collapse and translate the baffle to accommodate a threat level of the environment of the aircraft.

12. An infrared suppressor in accordance with claim 11 wherein said collapsible and translatable baffle is configurable in a first mode in which a direct view of an exhaust cavity is blocked, a second mode in which the baffle is opened up to increase pumping and blocking of a line-of-sight into the engine, and a third mode in which the baffle is collapsed to reduce or minimize backpressure.

13. An infrared suppressor in accordance with claim 11 further comprising a hood and a panel configured to be positioned, rotated, or both.

14. An infrared suppressor in accordance with claim 13 wherein said collapsible and translatable baffle is configurable in a first mode in which a direct view of an exhaust cavity is blocked, a second mode in which the baffle is opened up to increase pumping and blocking of a line-of-sight into the engine, and a third mode in which the baffle is collapsed to reduce or minimize backpressure.

15. An infrared suppressor in accordance with claim 14 wherein, said hood and said panel are configured to be positioned, rotated, or both to turn the exhaust from the engine in said first mode.

16. An infrared suppressor in accordance with claim 10 further comprising a hood and a panel that are each repositionable in accordance with the threat environment.

17. An infrared suppressor in accordance with claim 16 wherein said hood and said panel are at least one of positionable or rotatable to turn the exhaust from the engine.

18. An infrared suppressor in accordance with claim 10 further configured to operate in a set of modes including a first mode in which a direct view of an exhaust cavity is blocked, a second mode that substantially blocks a line-of-sight into the engine, and a third mode in which backpressure is minimized or reduced.

19. An infrared suppressor for suppressing infrared radiation from an engine of an aircraft, said infrared suppressor comprising:
- a stage I duct having an adapter ring configured to slide over a tailpipe of the engine and a lobed mixer;
- a stage II duct coupled to said stage I duct and having a collapsible and translatable single baffle assembly, said stage II duct configured to receive exhaust from the engine that leaves said stage I duct; and
- a stage III duct coupled to said stage II duct and configured to receive exhaust from the engine that leaves said stage II duct, said stage III duct comprising a hood and a panel that are at least one of positionable or rotatable to turn exhaust leaving said stage III duct.

20. An infrared suppressor in accordance with claim 19 configured to operate in a set of modes including a first mode in which a direct view of an exhaust cavity is blocked, a second mode that pumps and blocks a line-of-sight into the engine, and a third mode in which backpressure is minimized or reduced.

* * * * *

UNITED STATES PATENT AND TRADEMARK OFFICE
CERTIFICATE OF CORRECTION

PATENT NO. : 7,607,306 B2  Page 1 of 1
APPLICATION NO. : 11/196466
DATED : October 27, 2009
INVENTOR(S) : Steyer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1120 days.

Signed and Sealed this

Twelfth Day of October, 2010

David J. Kappos
*Director of the United States Patent and Trademark Office*